United States Patent
Jeong

(10) Patent No.: US 9,980,570 B2
(45) Date of Patent: May 29, 2018

(54) HEADREST FOLDING APPARATUS

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si, Gyeonggi-do (KR)

(*) Notice: Subject to any disclaimer, the term of this patent is extended or adjusted under 35 U.S.C. 154(b) by 204 days.

(21) Appl. No.: 14/766,970

(22) PCT Filed: Dec. 3, 2014

(86) PCT No.: PCT/KR2014/011763
§ 371 (c)(1),
(2) Date: Aug. 10, 2015

(87) PCT Pub. No.: WO2015/088175
PCT Pub. Date: Jun. 18, 2015

(65) Prior Publication Data
US 2015/0366353 A1     Dec. 24, 2015

(30) Foreign Application Priority Data

Dec. 10, 2013 (KR) ........................ 10-2013-0152810

(51) Int. Cl.
*A47C 3/38* (2006.01)
*A47C 7/38* (2006.01)
*B60N 2/841* (2018.01)

(52) U.S. Cl.
CPC .................. *A47C 7/38* (2013.01); *A47C 3/38* (2013.01); *B60N 2/841* (2018.02); *B60N 2/874* (2018.02)

(58) Field of Classification Search
CPC .... B60N 2/487; B60N 2/4805; B60N 2/4811; B60N 2/4832; B60N 2/4841; A47B 3/38; A47C 7/38
(Continued)

(56) References Cited

U.S. PATENT DOCUMENTS

| 6,050,633 A | 4/2000 | Droual ............................ 297/61 |
| 7,543,891 B2 | 6/2009 | Chung .......................... 297/408 |

(Continued)

FOREIGN PATENT DOCUMENTS

| DE | 198 10 347 A1 | 9/1998 | ............... B60N 2/48 |
| DE | 11 2005 000 915 B4 | 5/2009 | ............... B60N 2/48 |

(Continued)

OTHER PUBLICATIONS

International Searching Authority, International Search Report—International Application No. PCT/KR2014/011763, dated Mar. 19, 2015, 2 pages.
(Continued)

*Primary Examiner* — Robert Canfield
(74) *Attorney, Agent, or Firm* — Sunstein Kann Murphy & Timbers LLP

(57) ABSTRACT

Provided is a headrest folding apparatus. An oblique face is formed on a support for supporting a headrest. When the headrest is in an upright position, the oblique face comes into contact with a first member. The headrest folding apparatus prevents a loose gap from occurring in an upright state, simplifies components to be made compact, and allows a seat to be easily assembled and a manufacturing cost to be cut down.

7 Claims, 45 Drawing Sheets

(58) Field of Classification Search
USPC .......................................................... 297/408
See application file for complete search history.

(56) References Cited

U.S. PATENT DOCUMENTS

| | | | |
|---|---|---|---|
| 7,740,319 B2* | 6/2010 | Furukawa | B60N 2/20 297/391 |
| 8,083,291 B2* | 12/2011 | Yoshida | B60N 2/4841 297/408 |
| 8,226,170 B2* | 7/2012 | Lutzka | B60N 2/3009 297/403 |
| 8,348,347 B2* | 1/2013 | Willard | B60N 2/4844 297/408 |
| 8,382,206 B2* | 2/2013 | Grable | B60N 2/4847 297/408 |
| 8,857,910 B2 | 10/2014 | Jeong | 297/408 |
| 2005/0029853 A1 | 2/2005 | Gauthier et al. | |
| 2011/0084534 A1* | 4/2011 | Sohn | B60N 2/4841 297/408 |
| 2013/0320737 A1 | 12/2013 | Jeong | |
| 2015/0266401 A1* | 9/2015 | Grable | B60N 2/4844 297/408 |

FOREIGN PATENT DOCUMENTS

| | | | |
|---|---|---|---|
| JP | 2013-106960 | 6/2013 | ............... A47C 7/38 |
| KR | 10-2008-0094385 | 10/2008 | ............... B60N 2/48 |
| KR | 10-2009-0047671 | 5/2009 | ............... B60N 2/48 |
| WO | 2017/086600 | * 5/2017 | |

OTHER PUBLICATIONS

German Patent Office, Office Action—German Patent Application No. 11 2014 000 517.7, dated Mar. 16, 2017, 4 pages.
German Patent Office, (English Translation), Office Action—German Patent Application No. 11 2014 000 517.7, dated Mar. 16, 2017, 2 pages.
Korean Intellectual Property Office, Office Action: Notification of Grounds for Rejection—Application No. 10-2013-0152810, dated Apr. 23, 2014, 5 pages.
Korean Intellectual Property Office, Office Action: Notification of Grounds for Rejection—Application No. 10-2013-0152810, dated Apr. 23, 2014, 5 pages (English translation).
German Patent Office, Office Action—Application No. 11 2014 000 517.7, dated Jul. 10, 2017, 6 pages.
German Patent Office, Office Action—Application No. 11 2014 000 517.7, dated Jul. 10, 2017, 4 pages (English translation).

* cited by examiner

Prior Art

HEADREST FOLDING APPARATUS

TECHNICAL FIELD

This invention relates generally to a headrest folding apparatus and, more particularly, to a headrest folding apparatus in which an oblique face is formed on a support for supporting a headrest, and at least part thereof comes into contact with a first member when the headrest is in an upright position, thereby preventing a loose gap from occurring in an upright state, simplifying components to be made compact, and allowing a seat to be easily assembled and a manufacturing cost to be cut down.

BACKGROUND ART

A prior art headrest folding apparatus is disclosed in Korean Unexamined Patent Application Publication No. 2008-0094385.

Such a prior art headrest folding apparatus includes: a housing 10 that is mounted in a backrest of a seat and has guide recesses 12 whose upper portions are formed to be open at the same upper positions of opposite lateral plates 11 and whose centers are the same as the hinge holes 13; a stay rod 20 that is pivotably installed on the housing by hinge plates 23 whose rear ends are fixed at opposite sides of a horizontal portion 21 thereof and whose front ends are coupled to the respective hinge holes by hinge axles 24; a stay member in which a stay board 31 is mounted wherein the stay board 31 has guide holes 3 into which tips of both vertical portions 22 of the stay rod are inserted and which are formed in parallel at both sides thereof; a holding member 40 which is installed on an inner face of one of the lateral plates 11 by a holding axle 40b so as to be turned in the direction opposite to the stay rod by a repulsive force of a holding spring 40a and which has a holding recess 41 that is formed in an upper portion thereof and that holds the horizontal portion of the stay rod turned upward to be upright when the stay member is pushed upward and a holding step 42 that is formed at a lower end thereof; a brake member 50 which is installed at a lower portion of the inner face of one of the lateral plates 11 by a brake axle 50b so as to be turned in the direction opposite to the holding member by a repulsive force of a brake spring 50a and which has a brake step 51 that is formed at an upper end thereof and catches the holding step when the holding member holds the horizontal portion of the upright stay rod such that the holding member is braked to keep the stay rod upright without causing reverse rotation; a wire 60 which is tied to a rear end of the brake member at one end thereof and to a lever (not shown) installed outside the backrest at the other end thereof, pulls the brake member when the lever is operated, and turns the brake member in the direction opposite to the repulsive force of the brake spring so as to release braking of the holding member; a main spring 70 which is coupled to the hinge axle, which is hooked on the horizontal portion of the stay rod at one end thereof and on the other lateral plate of the housing at the other end thereof, and whose repulsive force is applied to turn and bend the stay rod in a forward and downward direction when the braking of the holding member caused by the brake member is released; and a link 80 whose front end is coupled to hinge segments 312 in the middle of a lower face of the stay board by an axle 81 and whose rear end is coupled to an upper end of a bracket 10a at a middle rear side of the housing by an axle 81' so as to be located at a rear upper side relative to the hinge axle.

Among reference symbols or numbers, 14' indicates an axle hole of the brake axle 50b, 17 indicates a stay piece, 16 indicates an insertion hole of the wire 60, 15 indicates a bottom plate, 11a indicates an axle hole of the axle 81', and 43 indicates a stay step.

This prior art headrest folding apparatus is complicated in structure, and the brake member 50 and the holding member 40 are worn away due to frequent use, which is responsible for a loose gap.

Further, to resolve this problem, a rubber member is installed in front of the brake member 50 and the holding member 40 of the headrest folding apparatus, but it is worn away due to frequent friction, which is also responsible for a loose gap.

SUMMARY OF INVENTION

Technical Problem

The present invention has been made to solve the above problems, and an object of the present invention is to provide a headrest folding apparatus that prevents a loose gap from occurring between a headrest and a locking member in an upright state, simplifies components to be made compact, and allows a seat to be easily assembled and a manufacturing cost to be cut down.

Solution to Problem

To achieve the object, there is provided a headrest folding apparatus that includes: a first member that is connected to one of a seat and a headrest; a second member that is connected to the other of the seat and the headrest and is pivotably installed on the first member; a main spring that is connected between the first member and the second member and applies an elastic force to the first and second members so as to displace the headrest to a second position; and a locking member that is installed on the second member, is disposed in a direction opposite to the second position with respect to the first member so as to come into contact with the first member, and fixes the headrest at a first position. One of the first and second positions is a position at which the headrest is folded, and the other position is a position at which the headrest is erect. The locking member has an oblique face formed on a contact face coming into contact with the first member, and the first member comes into contact with at least part of the oblique face of the locking member when the headrest is located at the first position.

Here, the headrest folding apparatus may further include: a return spring that returns the locking member to its original position; and a driving member that drives the locking member.

Further, the driving member may be either a wire that is connected to the locking member and unlocks the headrest, or a button unit that presses the locking member to unlock the headrest.

Further, the locking member may be pivotably installed on the second member, a pivotal shaft of the locking member may be disposed in a forward/backward direction, and a pivotal shaft of the second member may be disposed in a leftward/rightward direction, or the pivotal shaft of the locking member and the pivotal shaft of the second member may be disposed parallel to each other.

Also, the second member may be connected to the seat, and the first member may be connected to the headrest. The pivotal shaft of the locking member may be disposed around the second position with respect to the first member.

Further, the locking member may be installed on the second member so as to be slidable up and down. The locking member may include supporting plate receiving holes between which the return spring is disposed and which are formed in an upward/downward direction, and the second member may include supporting plates that are disposed in the supporting plate receiving holes and support one end of the return spring. Further, the second member may be coupled with a bracket in which a guide channel for guiding the locking member is formed in the upward/downward direction, and the supporting plates may be formed on the bracket.

In addition, the second member may have a guide channel that guides the locking member and is formed in the upward/downward direction.

Advantageous Effects of Invention

As described above, the headrest folding apparatus of the present invention has the following effects.

An oblique face is formed on a support for supporting a headrest, and comes into contact with a first member when the headrest is in an upright position. When the headrest is folded, the headrest and the support are prevented from interfering with each other, and a loose gap is prevented from occurring in an upright state. The components are simplified to make the headrest folding apparatus compact, which allows a seat to be easily assembled and a manufacturing cost to be cut down.

Furthermore, since the headrest folding apparatus further includes a return spring that returns the locking member to its original position, and a driving member that drives the locking member, a user can easily operate the headrest to a folded state and an upright state.

Since the driving member is a wire that is connected to the locking member and unlocks the headrest or a button unit that presses the locking member to unlock the headrest, a structure connected to the seat can be further simplified.

Since the locking member is pivotably installed on the second member, a pivotal shaft of the locking member is disposed in a forward/backward direction, and a pivotal shaft of the second member is disposed in a leftward/rightward direction, it is possible to reduce a width of the apparatus in a forward/backward direction, to make the apparatus compact, to increase a thickness of the support, and to improve durability of the support.

A pivotal shaft of the locking member and a pivotal shaft of the second member are disposed parallel to each other, and thus a shape of the support can be simplified.

Since the second member is connected to the seat, and the first member is connected to the headrest, and since the pivotal shaft of the locking member is disposed around the second position with respect to the first member, a driving force of the driving member can be smoothly transmitted.

Since the locking member is installed on the second member so as to be slidable up and down, since the locking member includes supporting plate receiving holes between which the return spring is disposed and which are formed in an upward/downward direction, and since the second member includes supporting plates that are disposed in the supporting plate receiving holes and support one end of the return spring, a structure is simplified.

Since the second member is coupled with a bracket in which a guide channel for guiding the locking member is formed in the upward/downward direction, and since the supporting plates are formed on the bracket, the second member is easily installed, and the second member is stably protected and slid.

DETAILED DESCRIPTION OF EMBODIMENT

Figure 1:
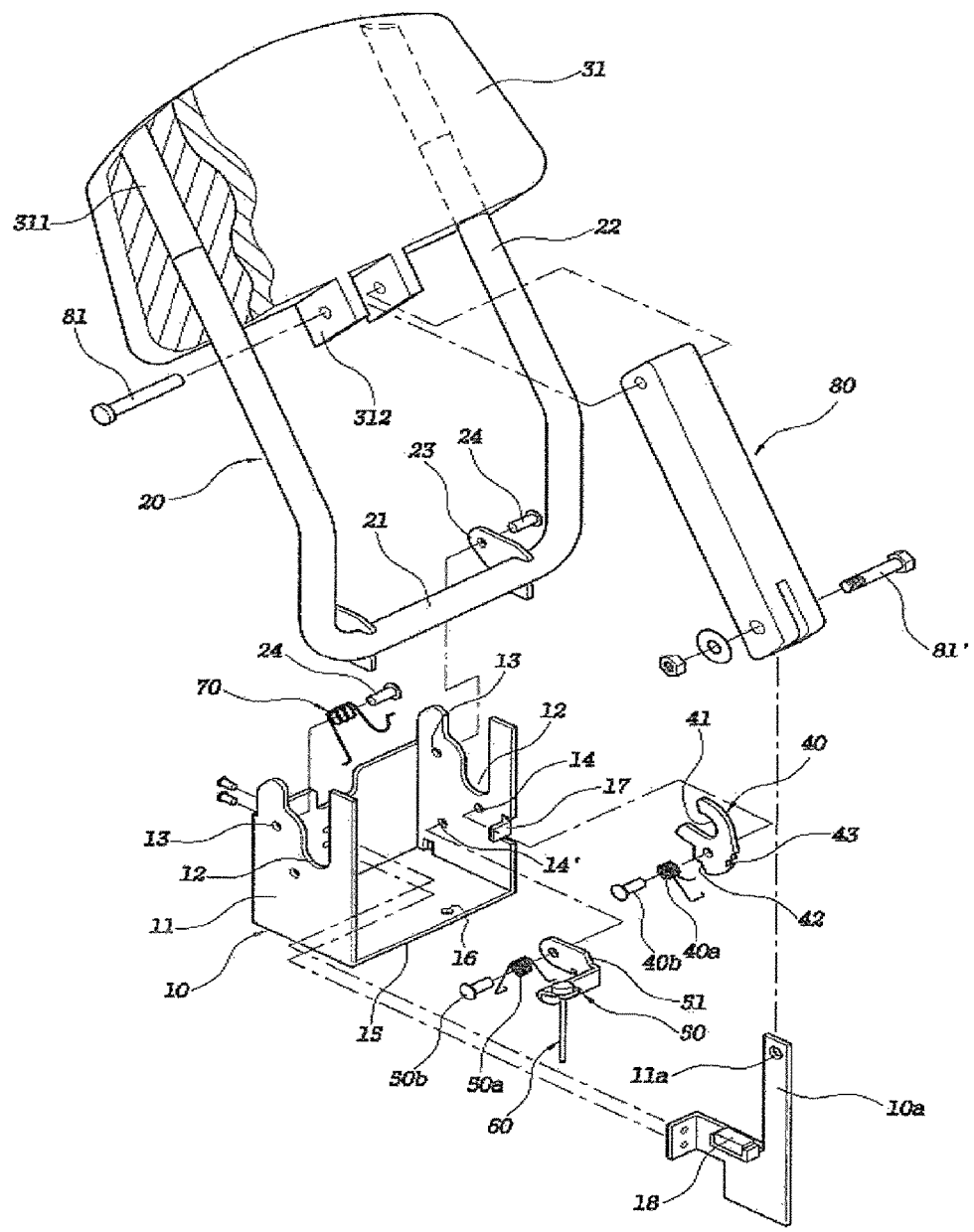
FIG. 1 is an exploded perspective view of a prior art headrest folding apparatus.
Figure 2:
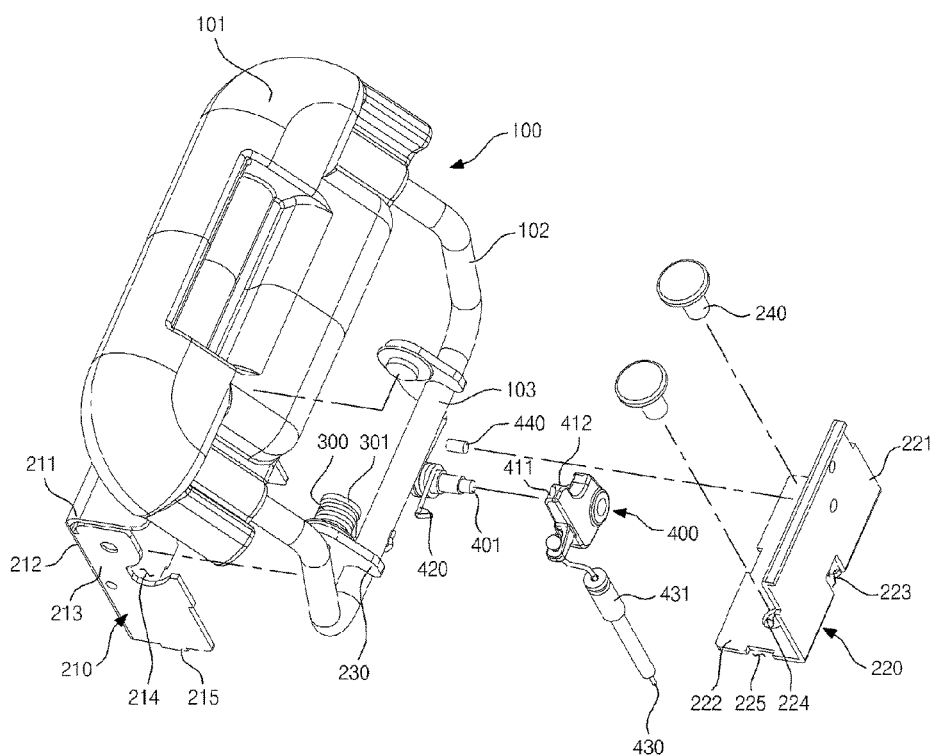
FIG. 2 is an exploded perspective view of a headrest folding apparatus according to a first embodiment of the present invention.
Figure 3:
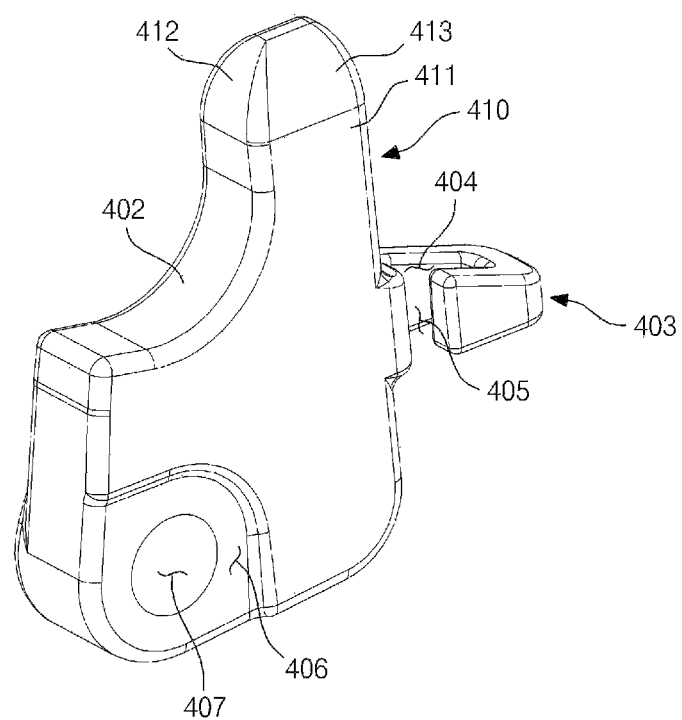
FIG. 3 is a perspective view of a locking member of FIG. 2.
Figure 4:
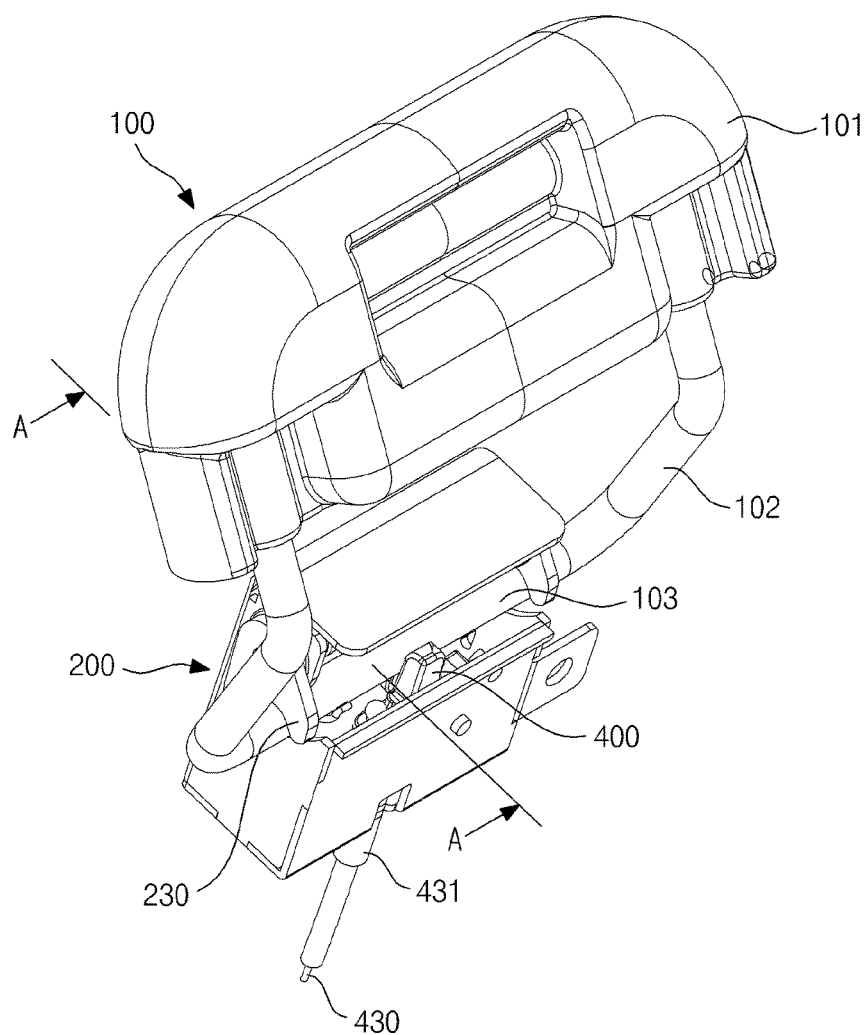
FIG. 4 is an assembled perspective view of the headrest folding apparatus of FIG. 2.
Figure 5:
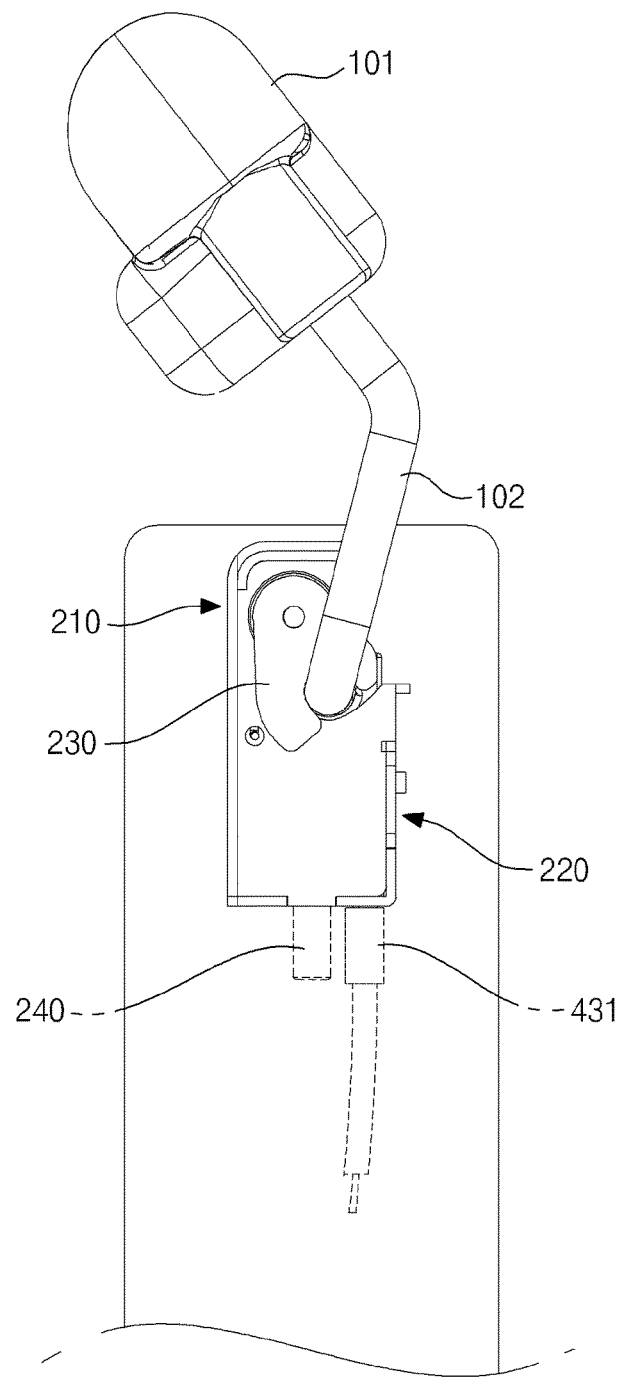
FIG. 5 is a side view of the headrest folding apparatus of FIG. 2.
Figure 6:
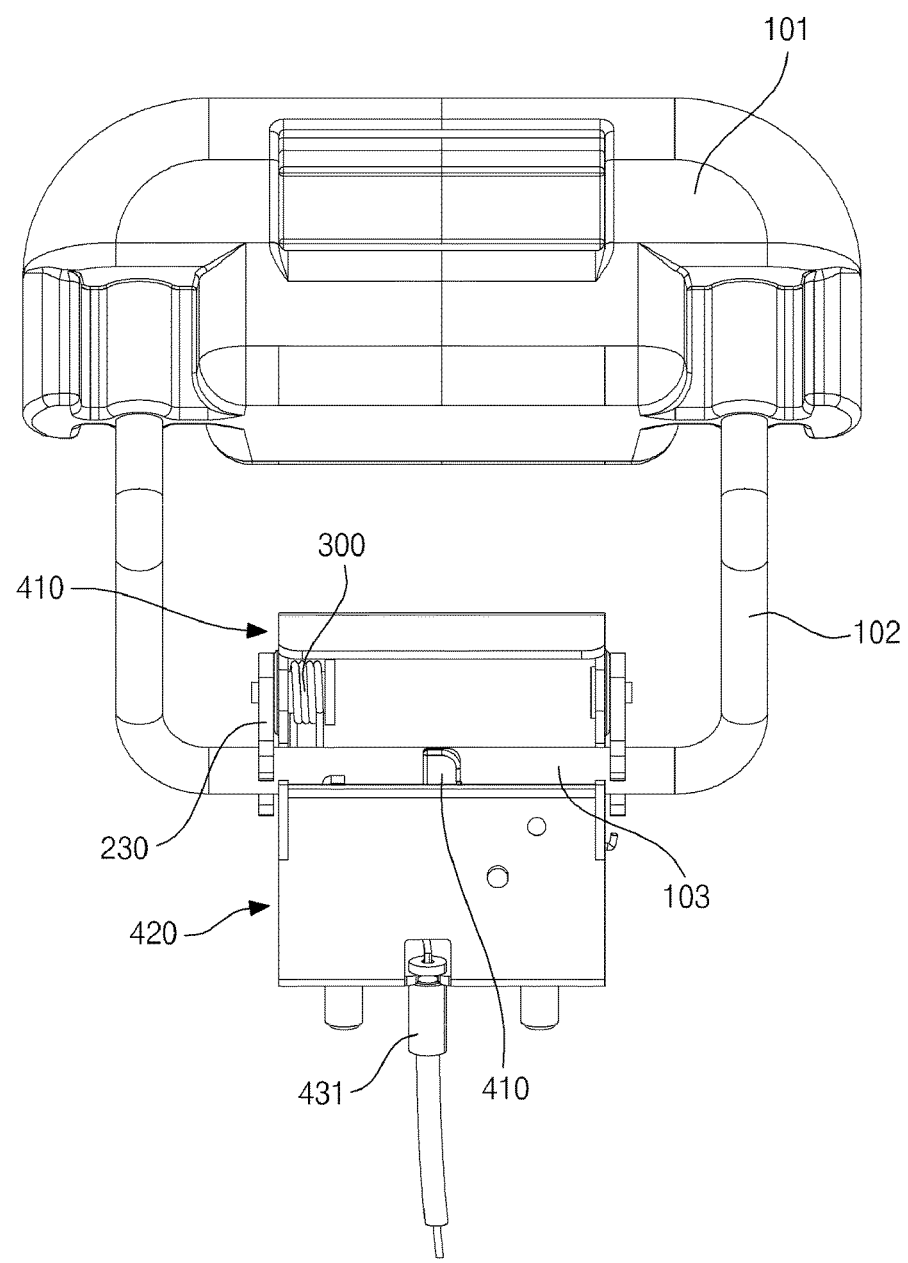
FIG. 6 is a rear perspective view of the headrest folding apparatus of FIG. 2.
Figure 7:
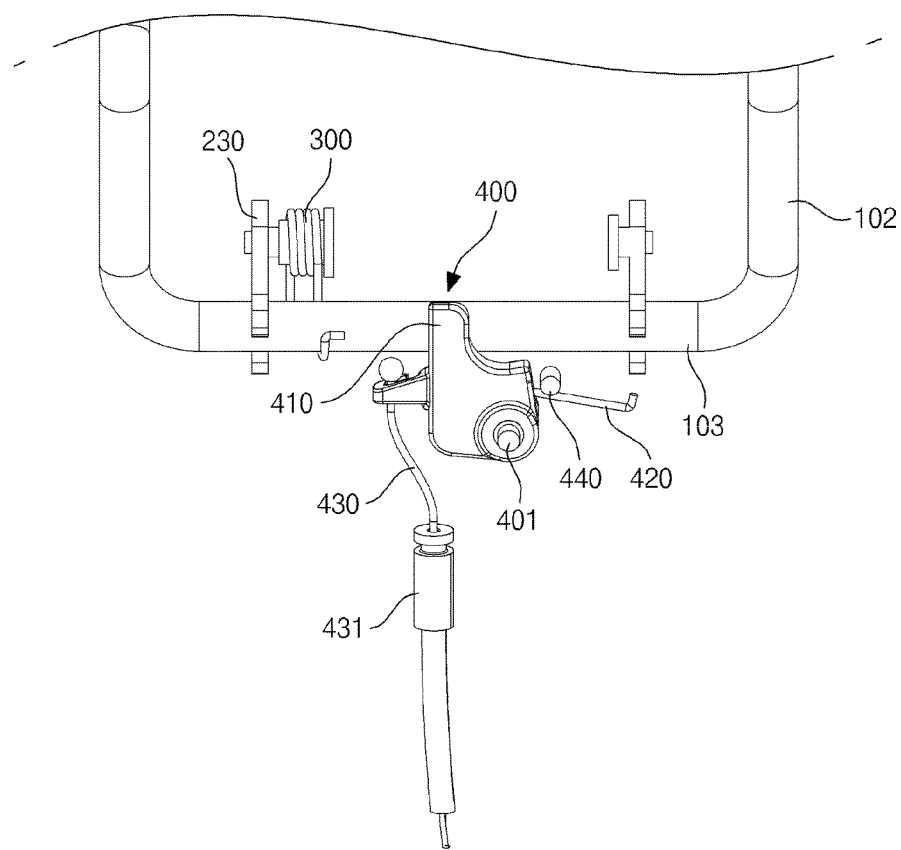
FIG. 7 is a rear view when a second member is removed from the headrest folding apparatus of FIG. 2.
Figure 8:
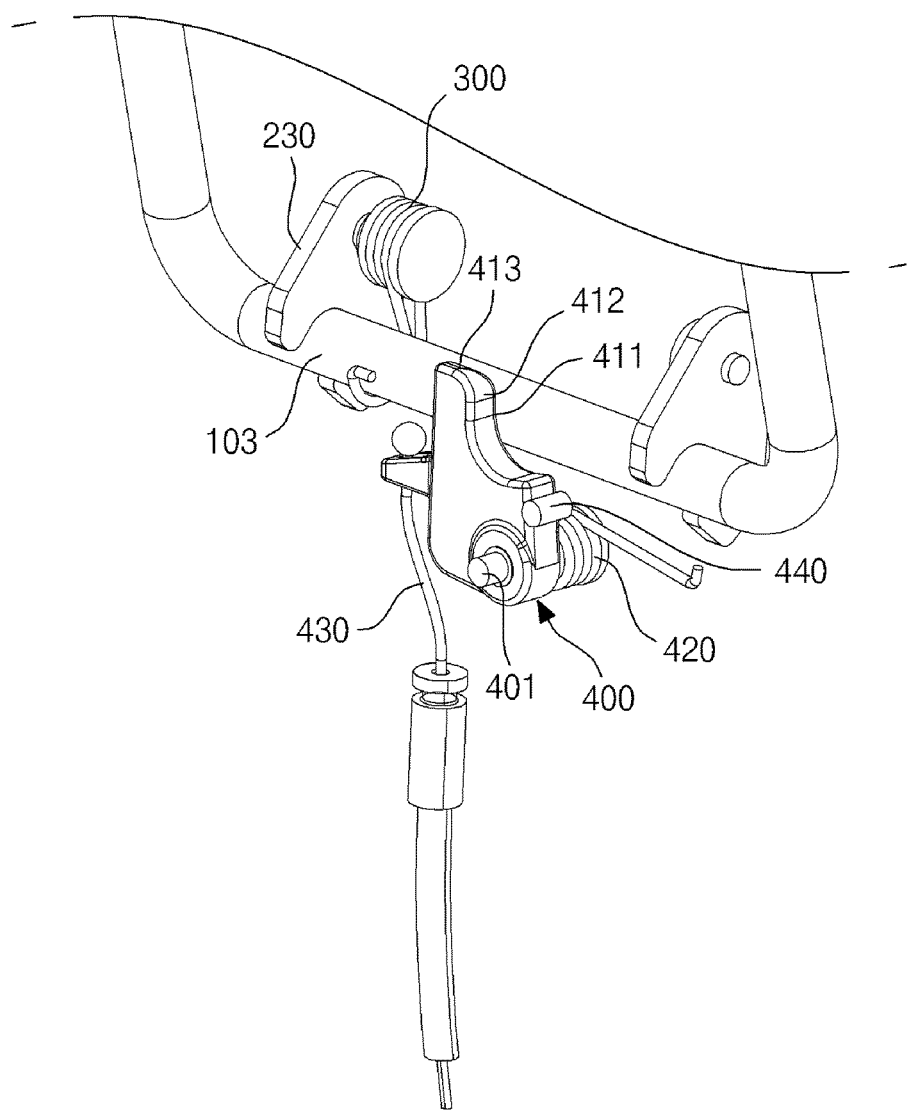
FIG. 8 is a rear perspective view when the second member is removed from the headrest folding apparatus of FIG. 2.
Figure 9:
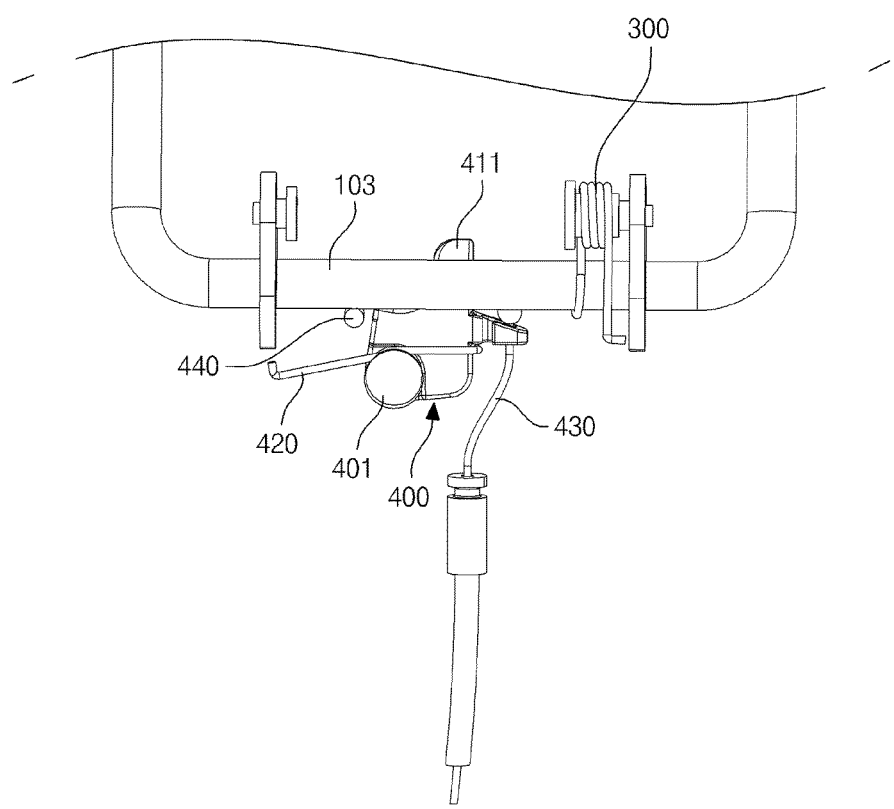
FIG. 9 is a front view when the second member is removed from the headrest folding apparatus of FIG. 2.
Figure 10:
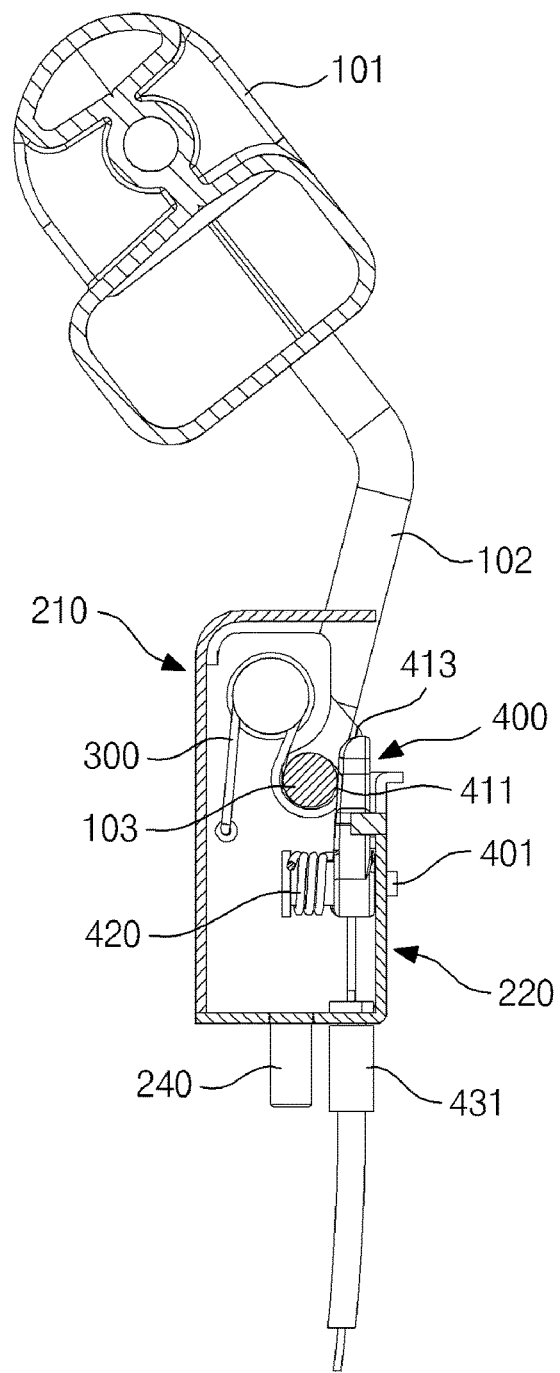
FIG. 10 is a cross-sectional view taken along line A-A of FIG. 4 (when a headrest is located at an upright position)
Figure 11:
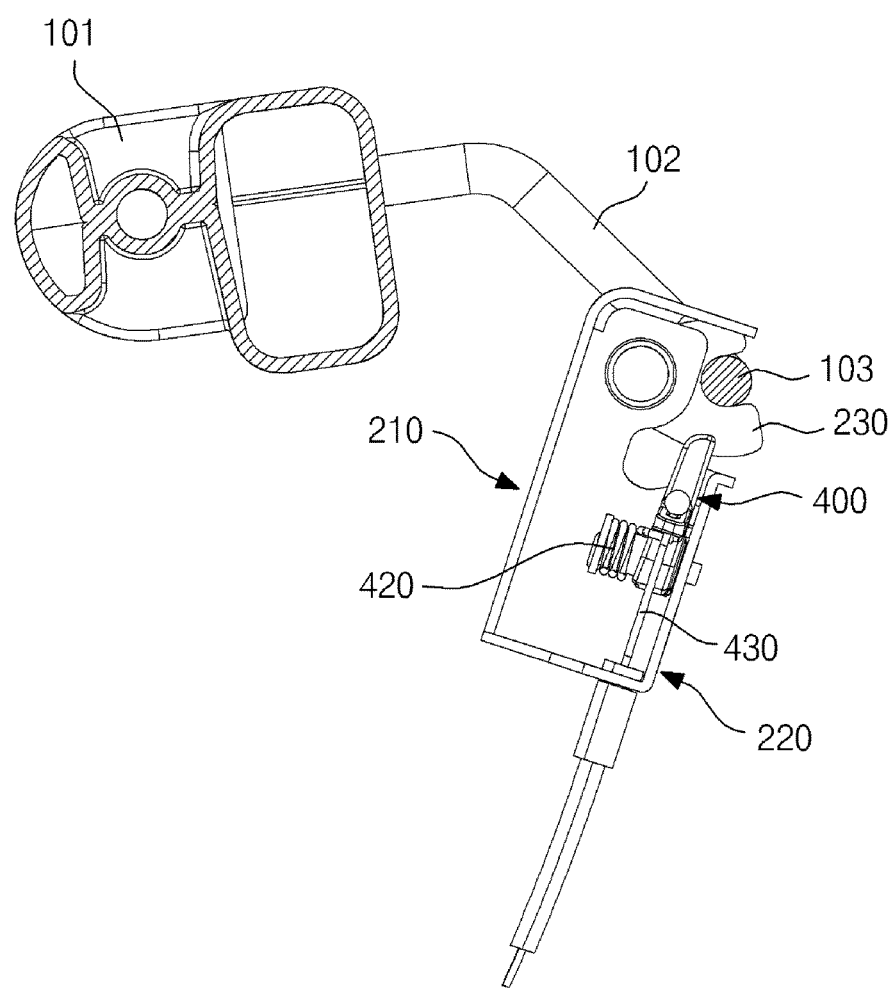
FIG. 11 is a cross-sectional view of the headrest folding apparatus according to the first embodiment when the headrest is located at a folded position.

Hereinafter, exemplary embodiments of the present invention will be described in detail with reference to the accompanying drawings.

For reference, among components of the present invention which will be described below, the same components as in the prior art refer to the aforementioned prior art, and detailed description thereof will be omitted.

First Embodiment

As illustrated in FIGS. 2 to 12, a headrest folding apparatus of a first embodiment includes: a first member 100 connected to a headrest; a second member 200 that is connected to a seat and is pivotably installed on the first member 100; a main spring 300 that is connected between the first member 100 and the second member 200 and applies an elastic force to the first and second members 100 and 200 so as to displace the headrest to a second position (hereinafter also called a "front or folded position"); and a locking member 400 that is installed on the second member 200, is disposed in the direction opposite to the second position with respect to the first member 100 so as to come into contact with the first member 100, and fixes the headrest at a first position (hereinafter also called an "upright position"), wherein the locking member 400 is provided with an oblique face 411 that is a contact face coming into contact with the first member 100, and the first member 100 comes into contact with at least part of the oblique face 411 of the locking member 400 when the headrest is located at the upright position.

The first member 100 is pivotably connected to the headrest.

The first member 100 includes vertical rods 102 disposed on both sides thereof in a vertical direction and a horizontal rod 103 connecting lower ends of both the vertical rods 102.

Each vertical rod 102 is bent backward at a lower portion thereof, forward at an upper portion thereof, and inward at an upper end thereof in a horizontal direction.

The headrest includes a head support 101 installed at the upper portions of the vertical rods 102.

The head support 101 is provided with grooves into which the upper portions and ends of the vertical rods 102 are fitted. The first member 100 is installed on the headrest.

The second member 200 is formed of a plate in a box shape, and is fixedly connected to the seat.

The second member 200 includes a first plate part 210 and a second plate part 220 installed in the rear of the first plate part 210.

The first plate part 210 includes a top plate 211, a front plate 212 continuously formed below the top plate 211, and sidewalls 213 disposed on opposite sides of the top plate 211 and on opposite sides of the front plate 212.

An edge between the top plate 211 and the front plate 212 is rounded.

Further, a slit is formed between the top plate 211 and an upper end of each sidewall 213 and between the top plate 211 and a part of an upper portion of the front plate 212.

Each sidewall 213 is provided with a first through recess 214 through the horizontal rod 103 of the first member 100 passes. When viewed from the side, the first through recess 214 is formed in an oblique shape such that a height is gradually reduced in a forward direction. The sidewall 213 is provided with a stopper above the first through recess 214. When the headrest is folded, the stopper comes into contact with the horizontal rod 103, and the horizontal rod 103 is no longer turned. In this way, an angle at which the headrest is folded can be controlled due to the stopper.

The first through recess 214 is formed such that a rear upper portion thereof is open.

An auxiliary plate part 230 having a second through recess through which the horizontal rod 103 passes is installed outside each sidewall 213. The auxiliary plate part 230 is integrally coupled to the horizontal rod 103 by, for instance, welding.

An upper portion of the auxiliary plate part 230 is provided with a fastening hole in which a pivotal shaft 301 of the first member 100 is fastened.

The second through recess is disposed below the fastening hole, and is formed such that a rear lower portion thereof is open.

A front upper portion of the sidewall 213 is provided with a fastening hole into which the pivotal shaft 301 is inserted such that the auxiliary plate part 230 can be installed by the pivotal shaft 301.

Further, a front middle portion of the sidewall 213 is provided with a fitting hole into which one end of the main spring 300 is fitted such that the main spring 300 (to be described below) can be connected.

The second plate part 220 includes a rear plate 221 and a bottom plate 222 continuously formed at a lower edge of the rear plate 221.

The rear plate 221 is provided with a first installing hole formed in a forward/backward direction and a second installing hole disposed above the first installing hole on the left side thereof.

An upper end of the rear plate 221 is provided with a bend that is bent in the backward direction.

The rear plate 221 is formed to have a lower height than the front plate 212.

A wire installing hole 223 is formed in a rear edge of the bottom plate 222 and in the lower edge of the rear plate 221.

The bottom plate 222 is provided with through-holes 224 at opposite sides thereof. Fastening bolts 240 pass through the through-holes 224 so as to be able to be installed on a frame of the seat.

Figure 12:
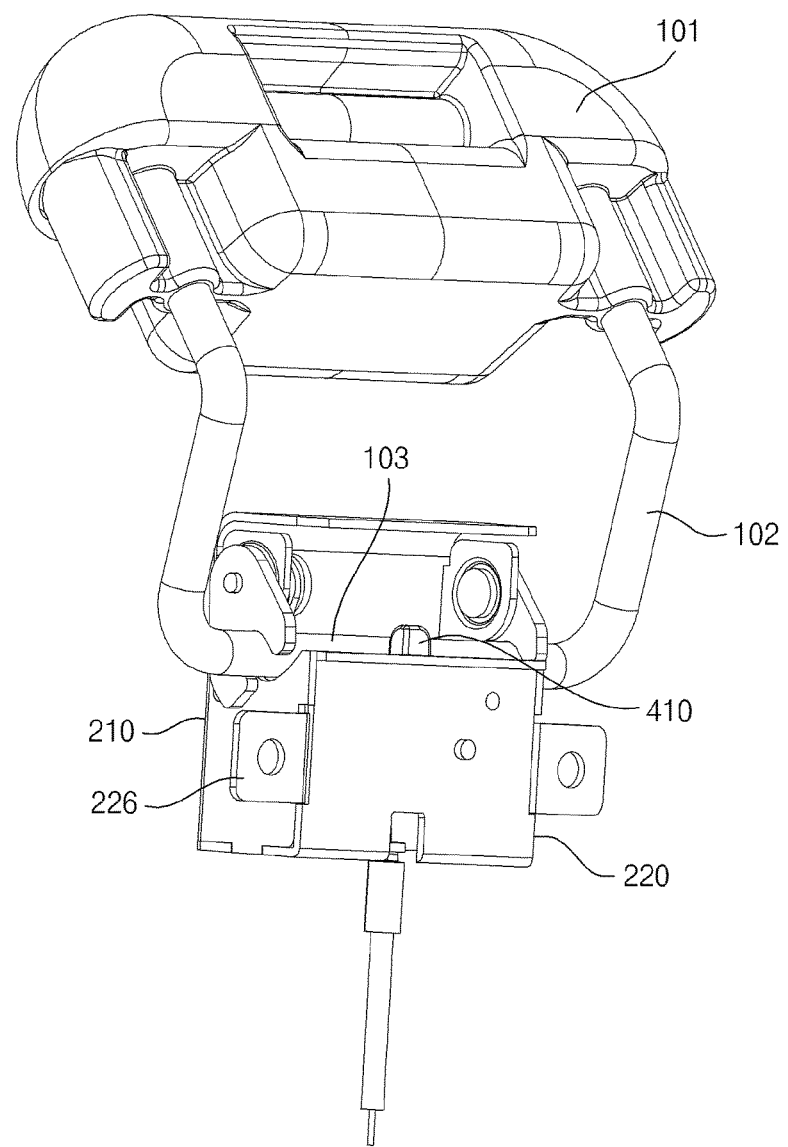
FIG. 12 is a rear perspective view of the headrest folding apparatus in which a bracket plate according to the first embodiment of the present invention is formed.
Figure 13:
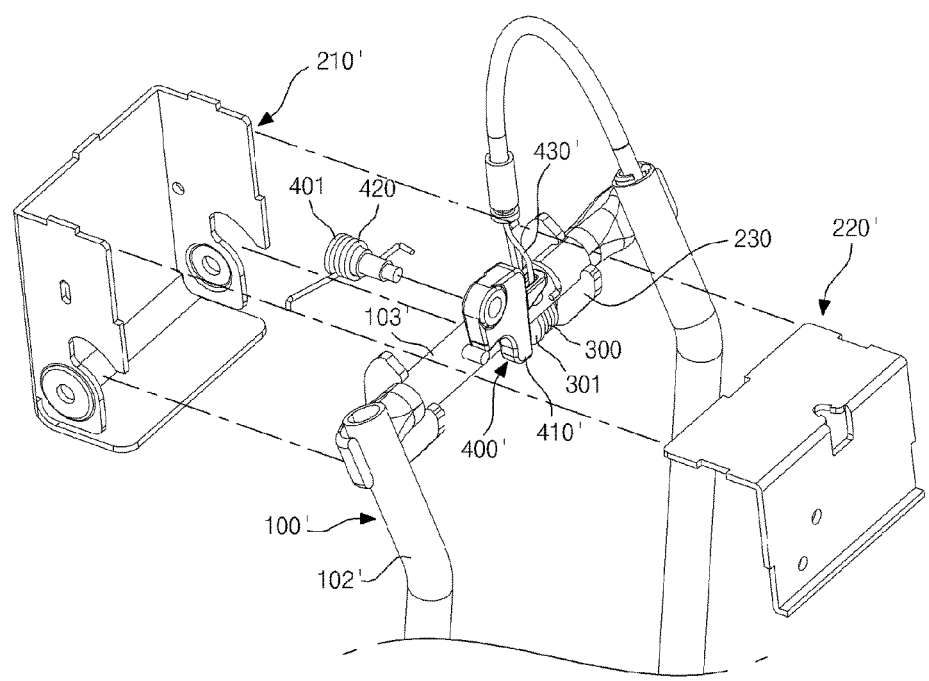
FIG. 13 is an exploded perspective view of a headrest folding apparatus according to a second embodiment of the present invention.
Figure 14:
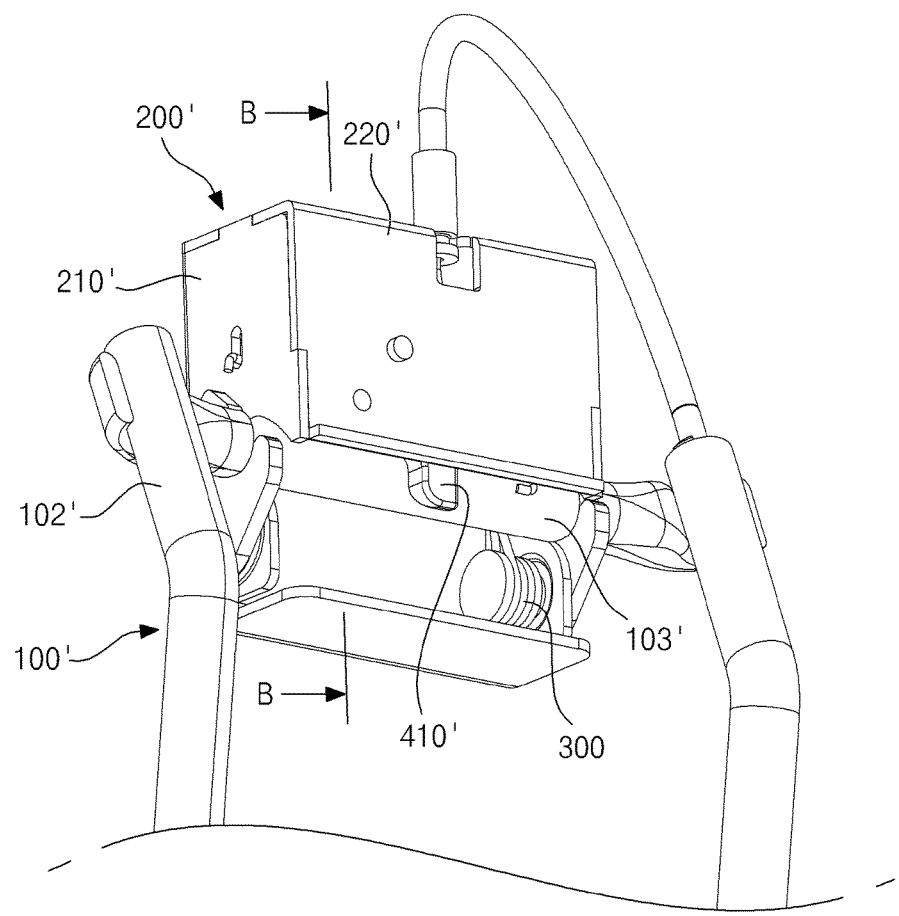
FIG. 14 is an assembled perspective view of a headrest folding apparatus of FIG. 13.
Figure 15:
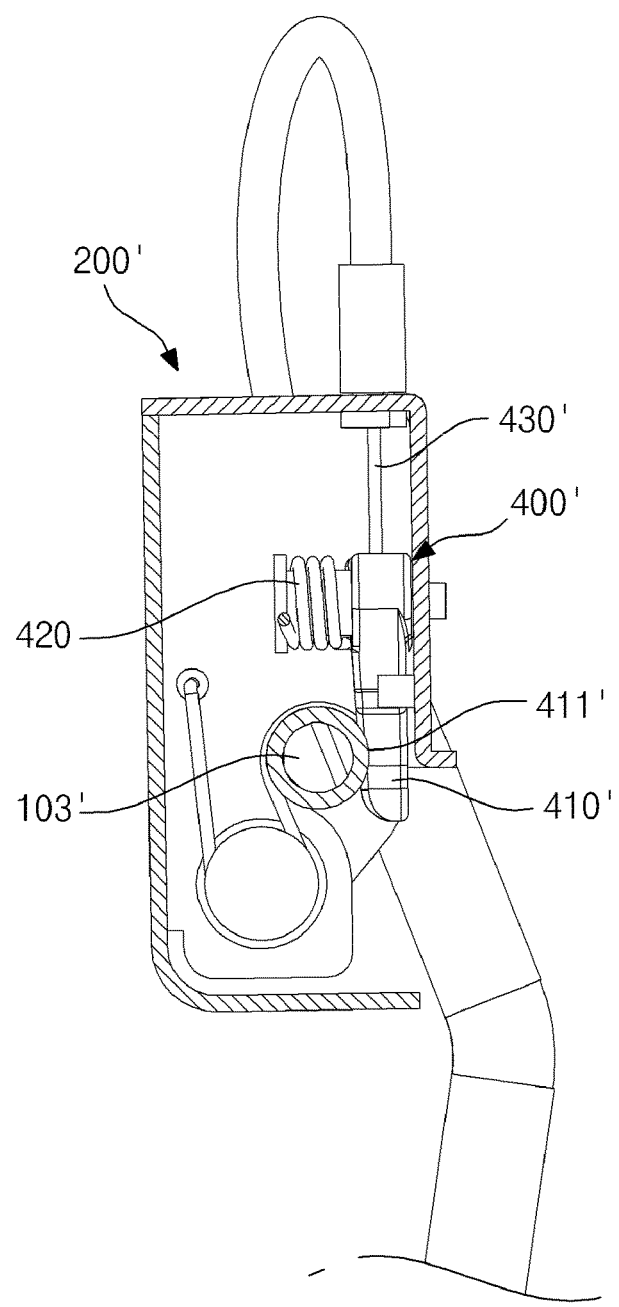
FIG. 15 is a cross-sectional view taken along line B-B of FIG. 14 (when a headrest is located at an upright position)
Figure 16:
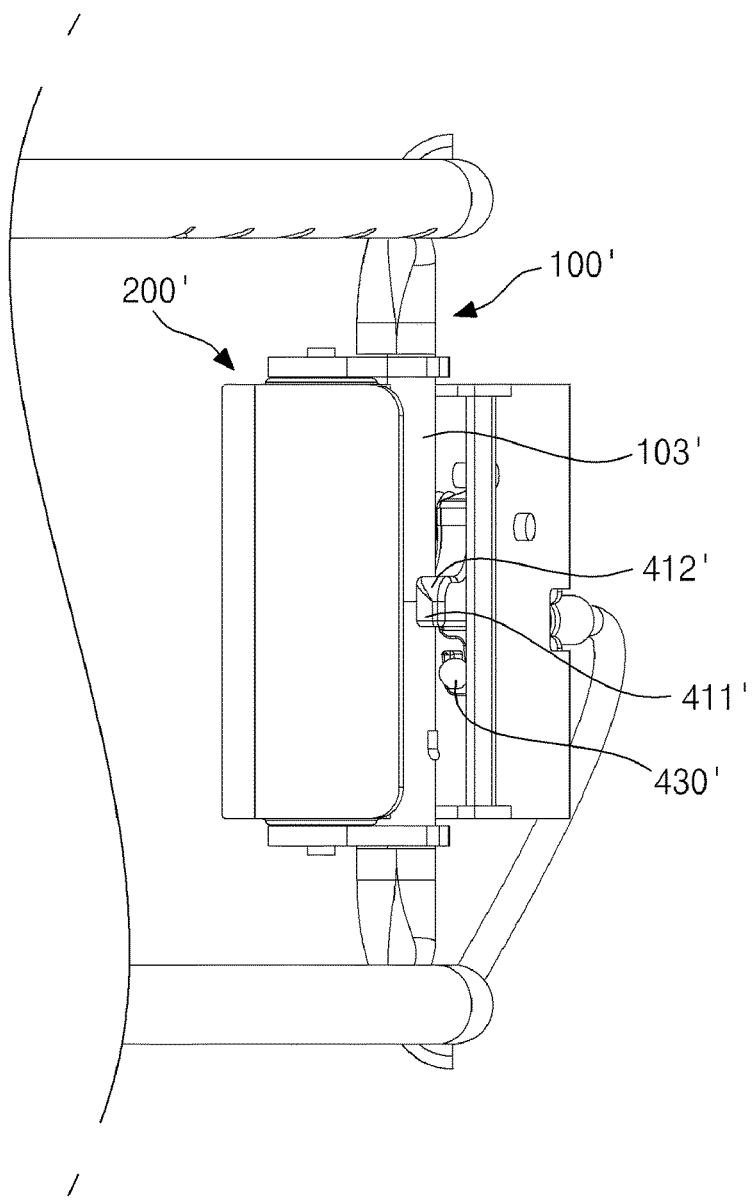
FIG. 16 is a bottom view of the headrest folding apparatus of FIG. 14.
Figure 17:
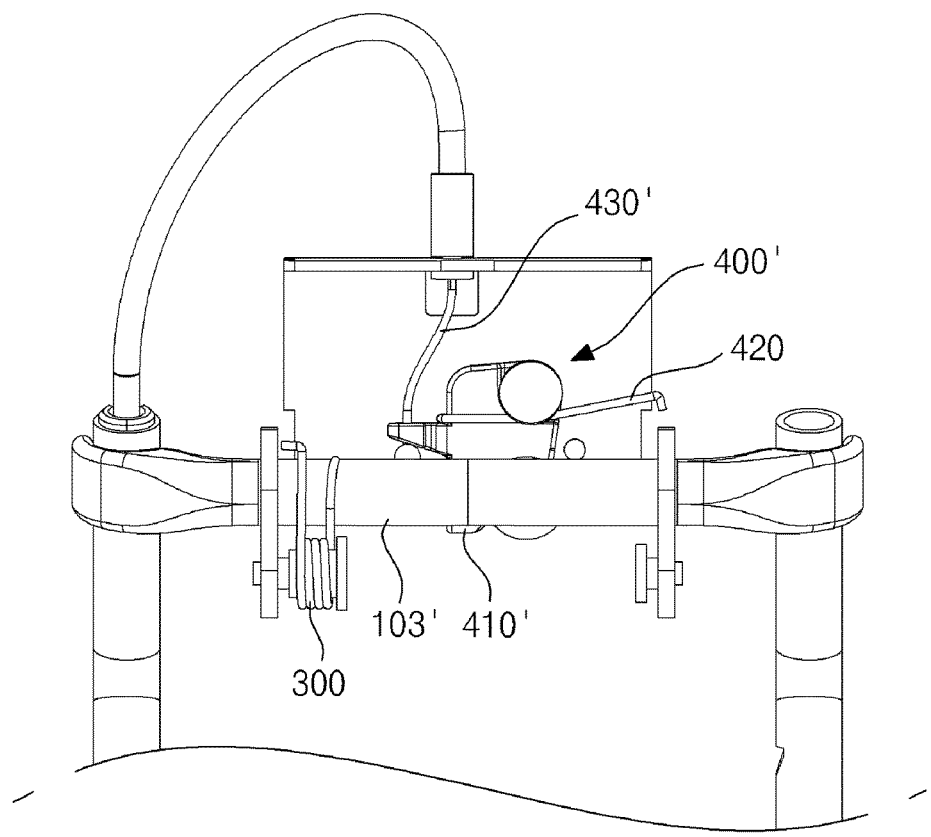
FIG. 17 is a front view when a first plate part is removed from the headrest folding apparatus of FIG. 14.
Figure 18:
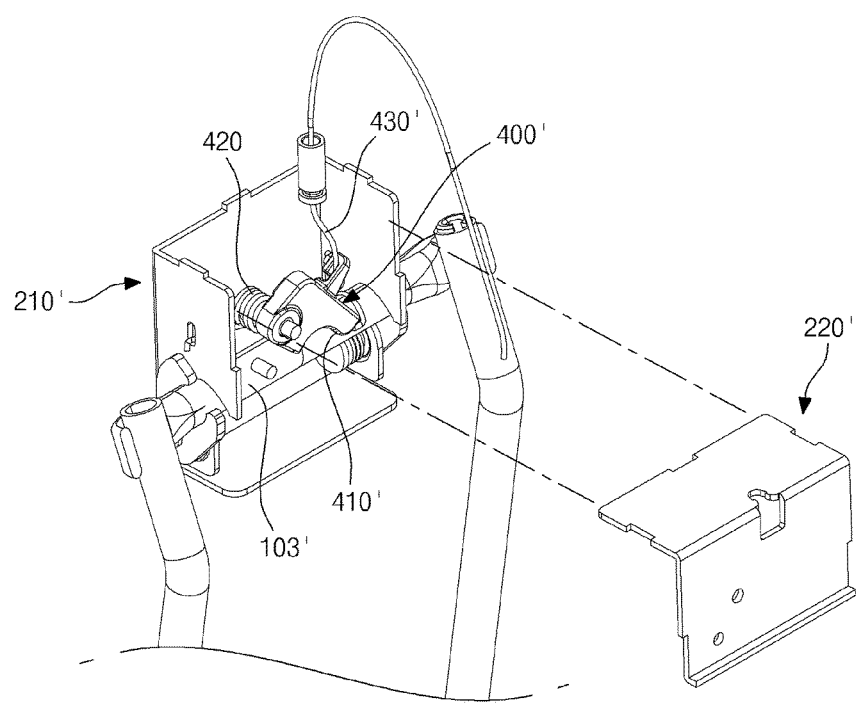
FIG. 18 is a rear perspective view when the first plate part is separated from the headrest folding apparatus of FIG. 14.
Figure 19:
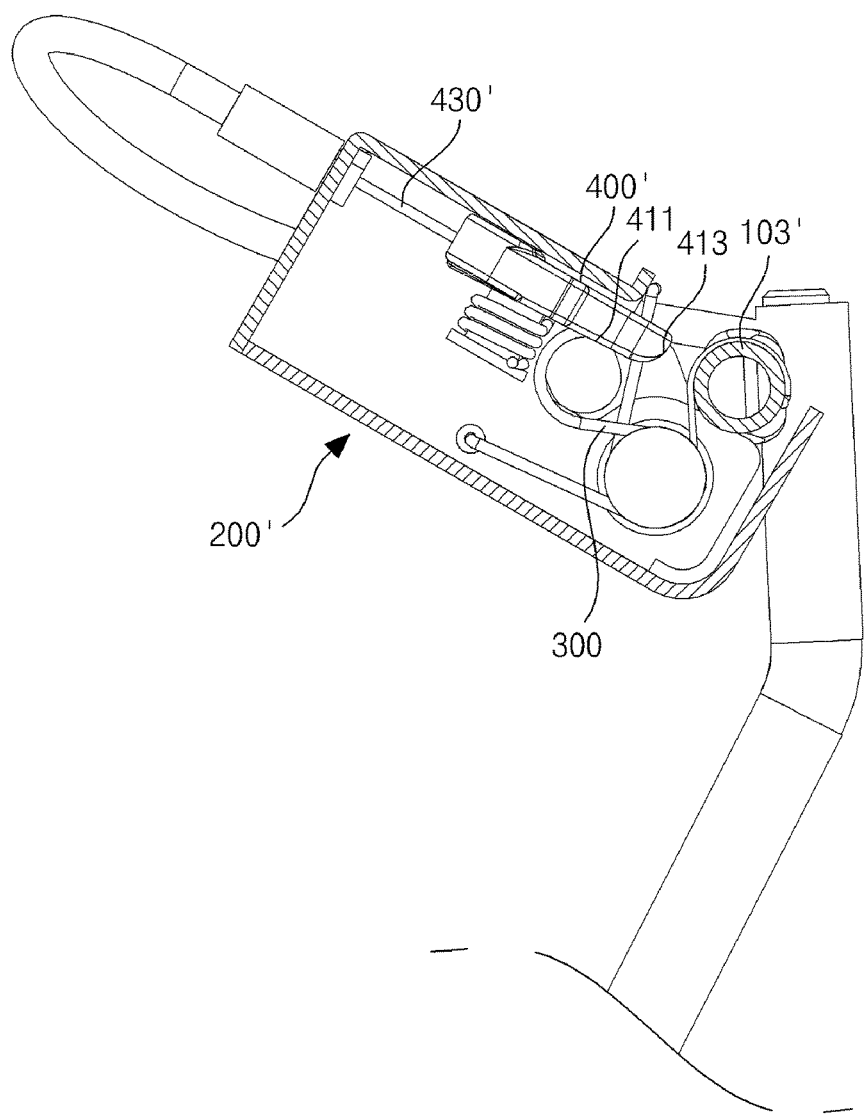
FIG. 19 is a cross-sectional view of the headrest folding apparatus according to the second embodiment when the headrest is located at a folded position.
Figure 20:
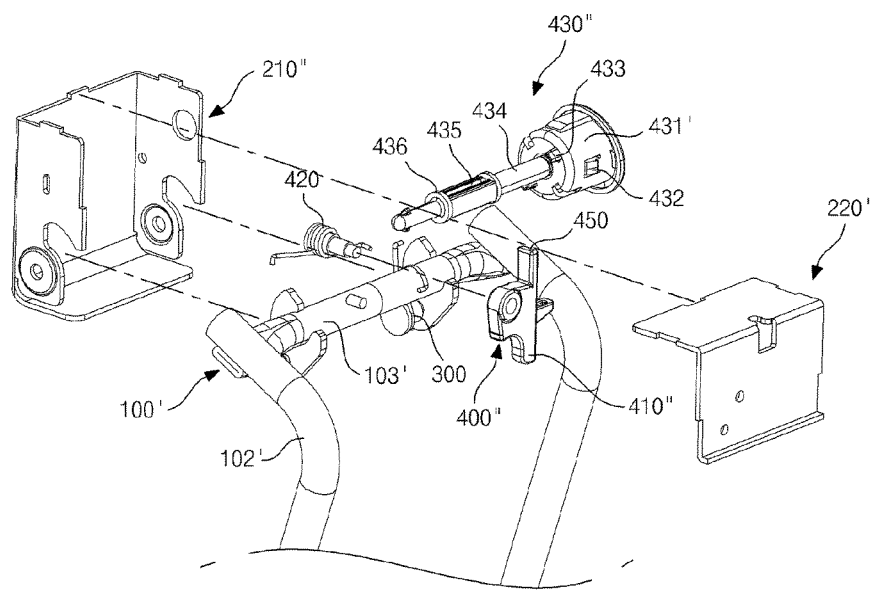
FIG. 20 is an exploded perspective view of a headrest folding apparatus according to a third embodiment of the present invention.
Figure 21:
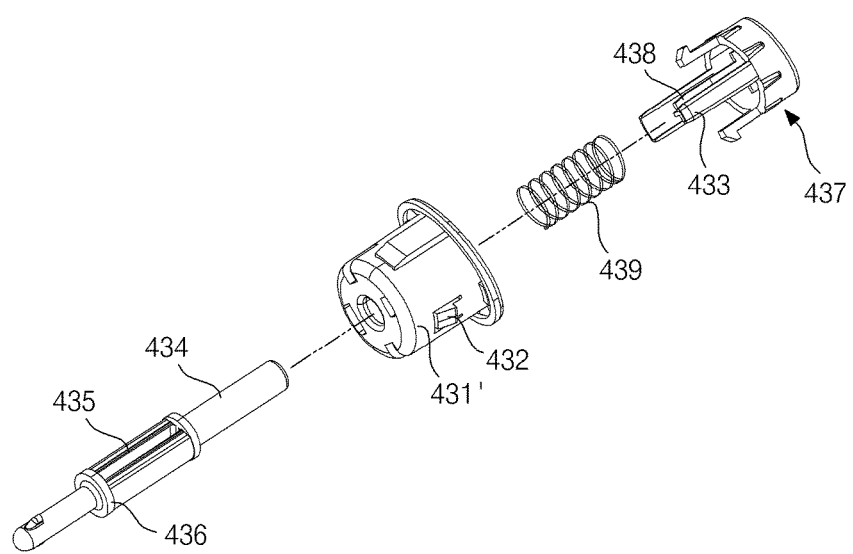
FIG. 21 is an exploded perspective view of a button part of the headrest folding apparatus according to the third embodiment.
Figure 22:
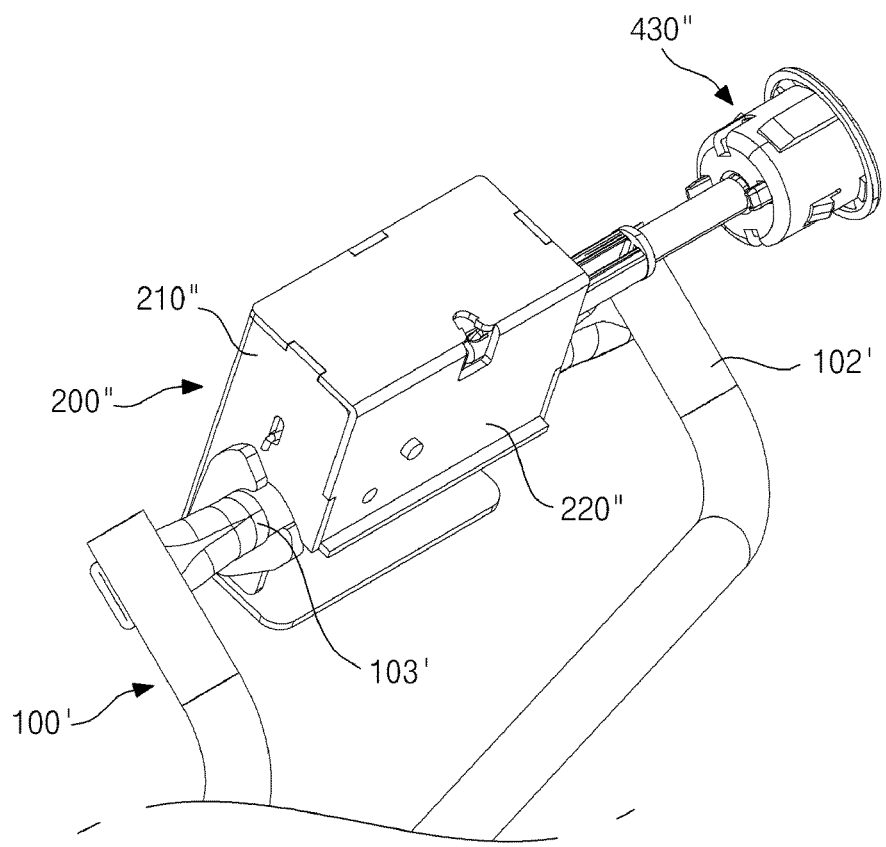
FIG. 22 is an assembled perspective view of the headrest folding apparatus of FIG. 20.
Figure 23:
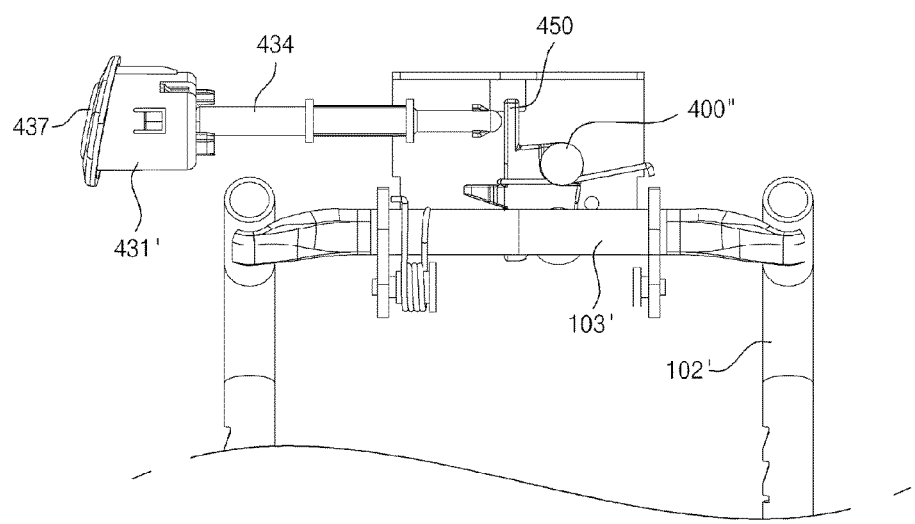
FIG. 23 is a front view when a first plate part is removed from the headrest folding apparatus of FIG. 20.
Figure 24:
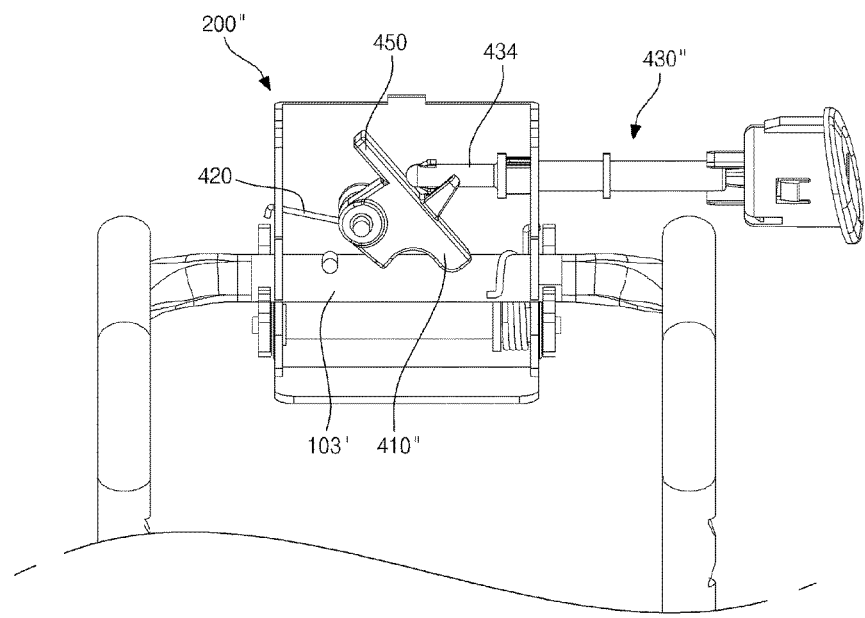
FIG. 24 is a rear view when a second plate part is removed from the headrest folding apparatus of FIG. 20 by pushing a locking member via a button part.
Figure 25:
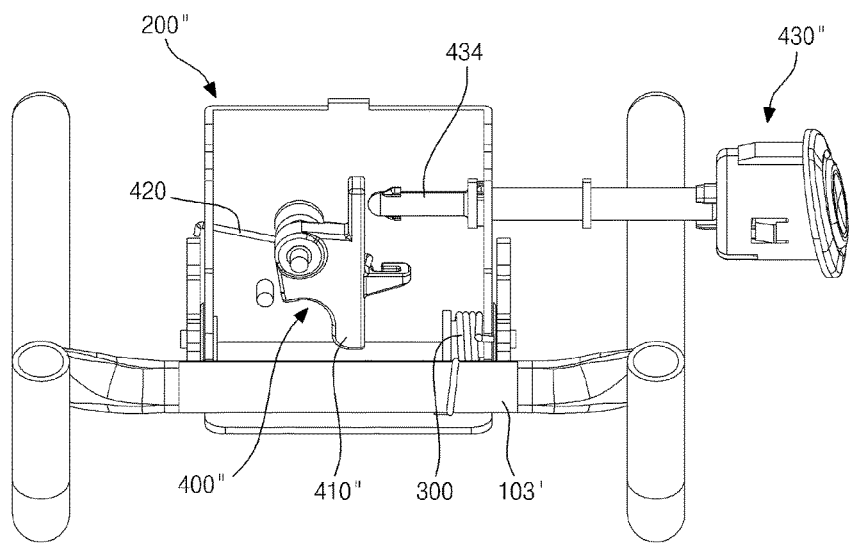
FIG. 25 is a plan view of the headrest folding apparatus according to the third embodiment when a headrest is located at a folded position.
Figure 26:
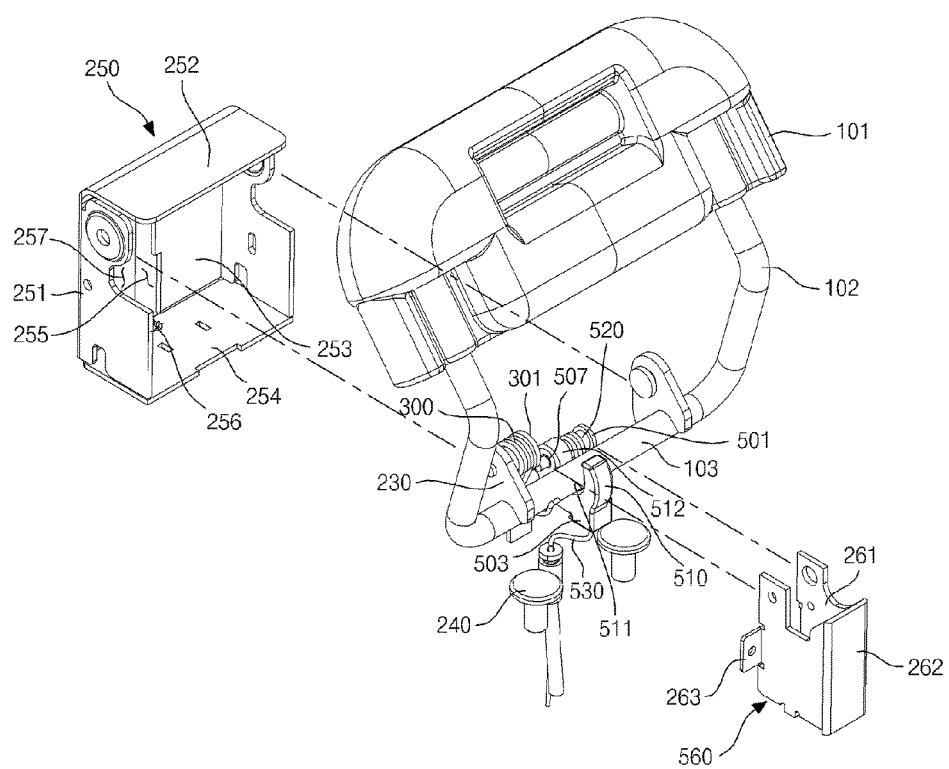
FIG. 26 is an exploded perspective view of a headrest folding apparatus according to a fourth embodiment of the present invention.
Figure 27:
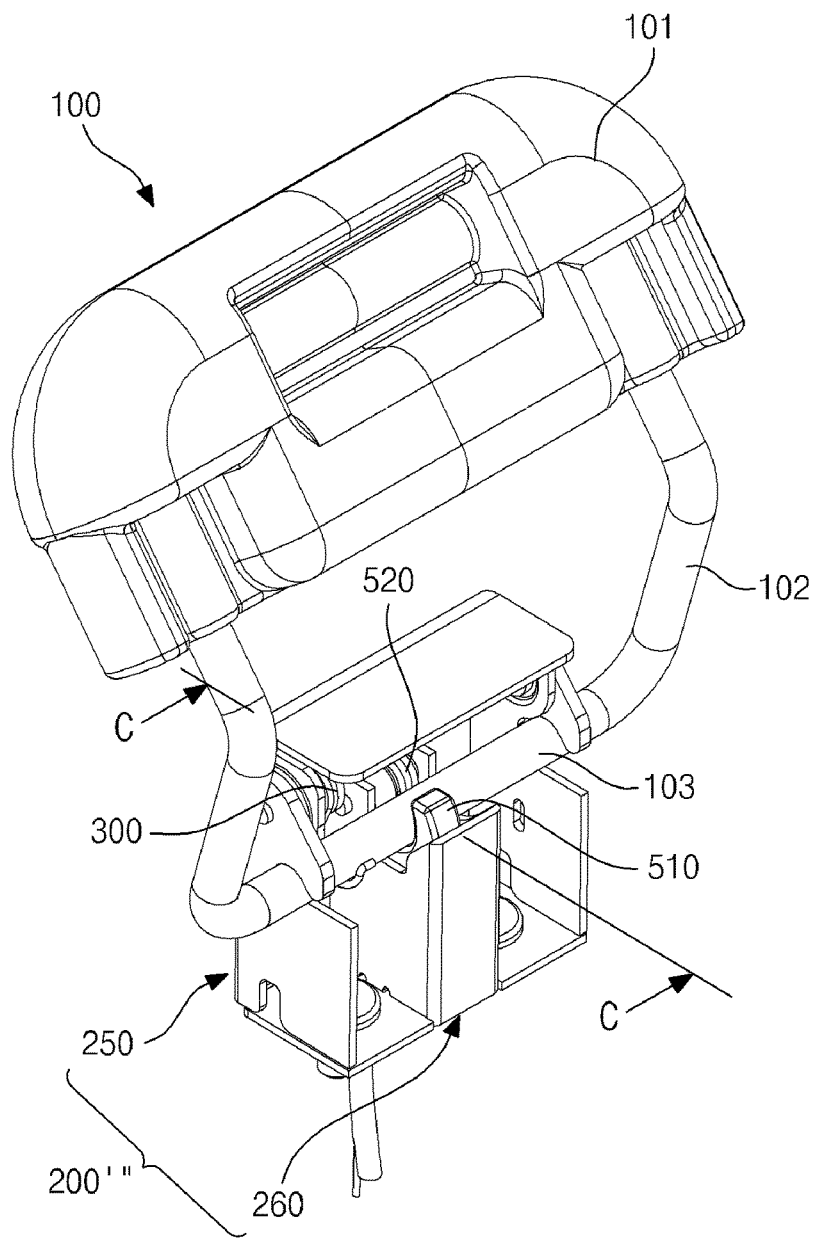
FIG. 27 is an assembled perspective view of the headrest folding apparatus of FIG. 26.
Figure 28:
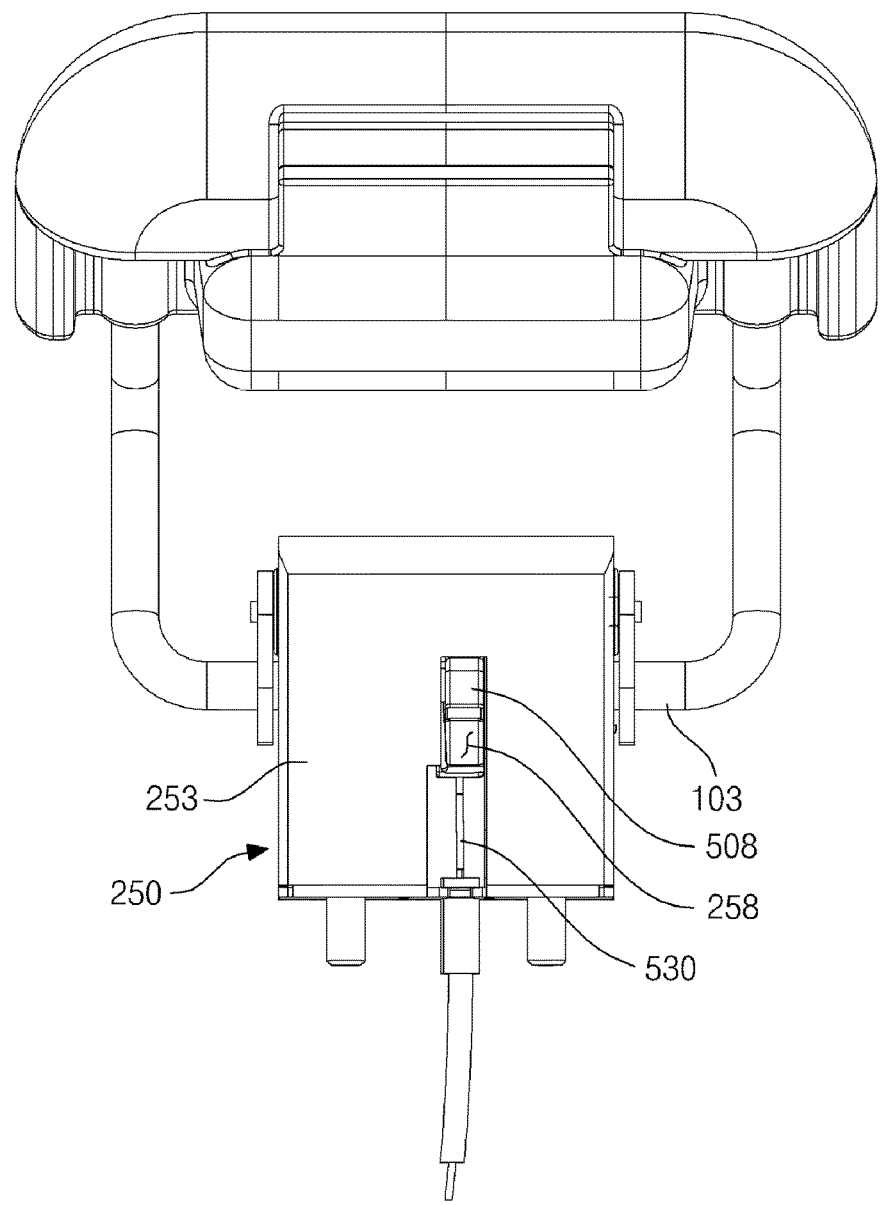
FIG. 28 is a front view of the headrest folding apparatus of FIG. 27.
Figure 29:
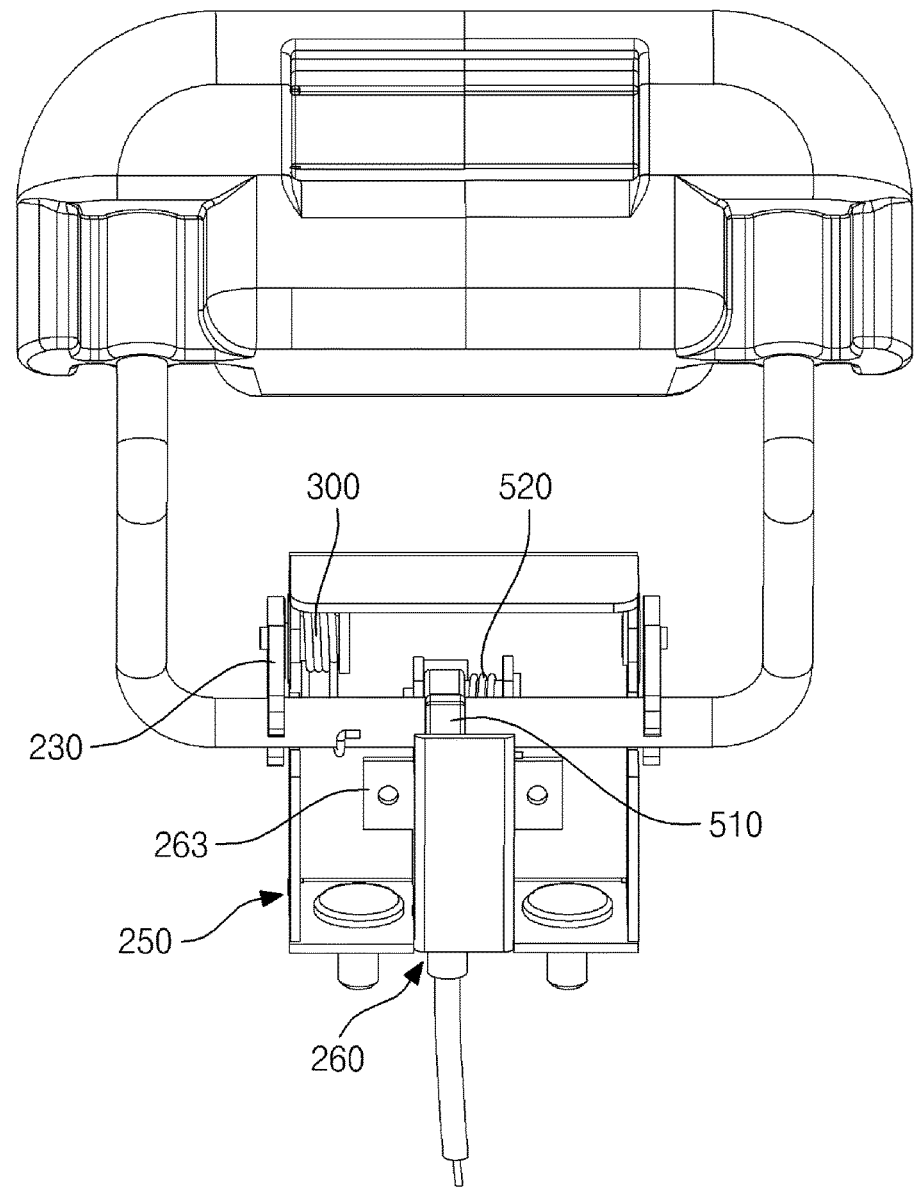
FIG. 29 is a rear view of the headrest folding apparatus of FIG. 27.
Figure 30:
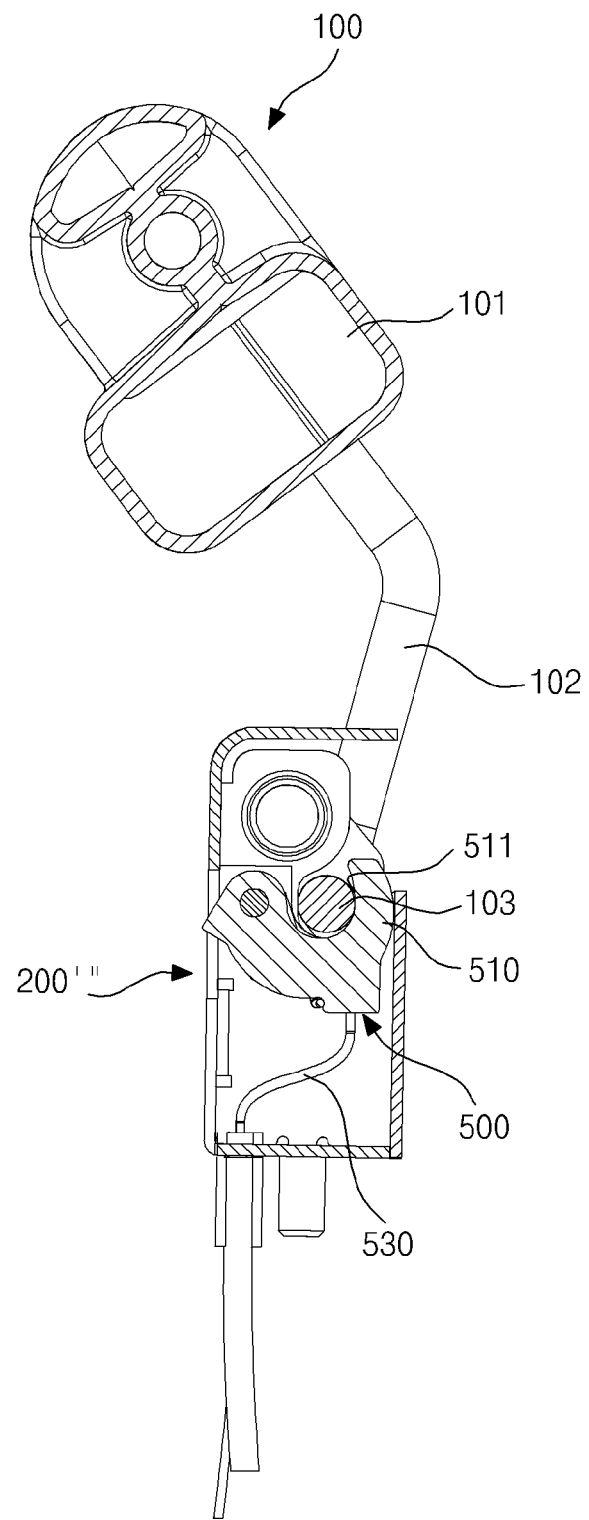
FIG. 30 is a cross-sectional view taken along line C-C of FIG. 27 (when a headrest is located at an upright position)
Figure 31:
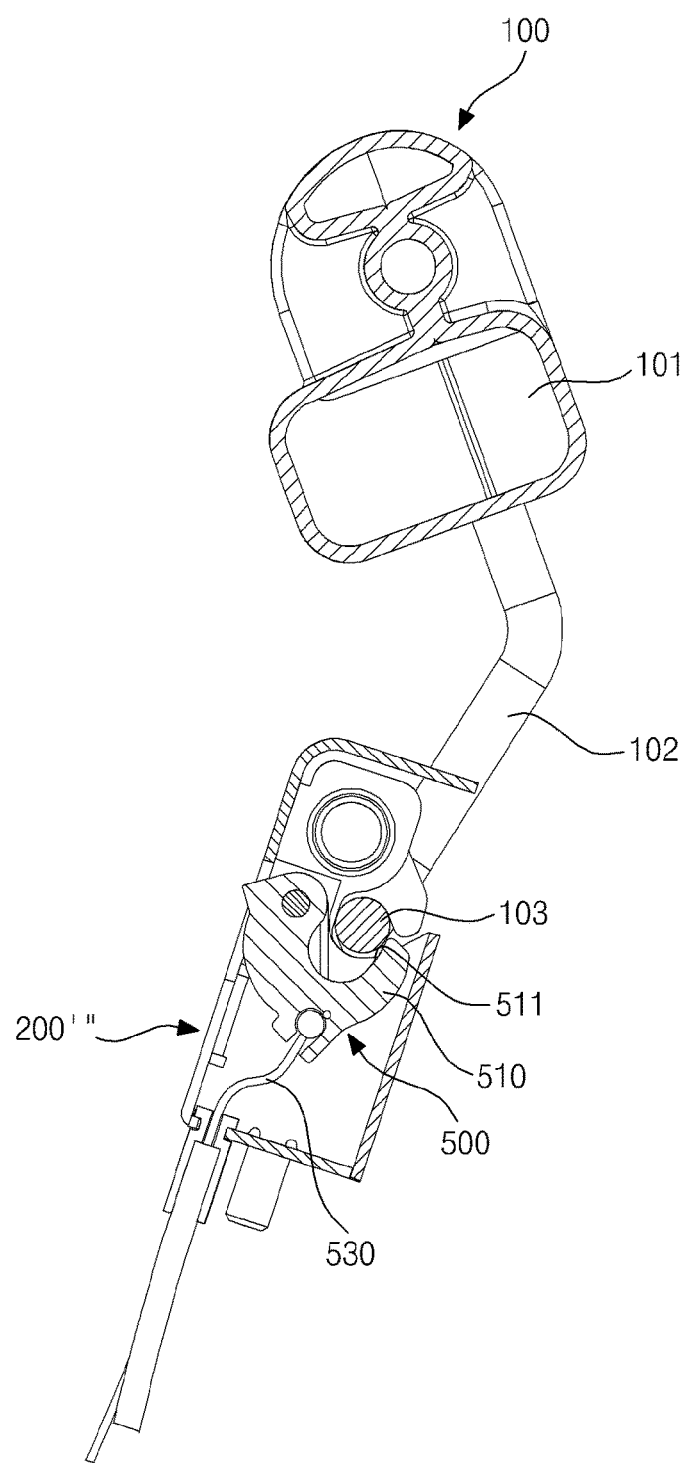
FIG. 31 is a cross-sectional view illustrating a state in which a locking member of the headrest folding apparatus according to the fourth embodiment is turned to fold the headrest by pulling a wire.
Figure 32:
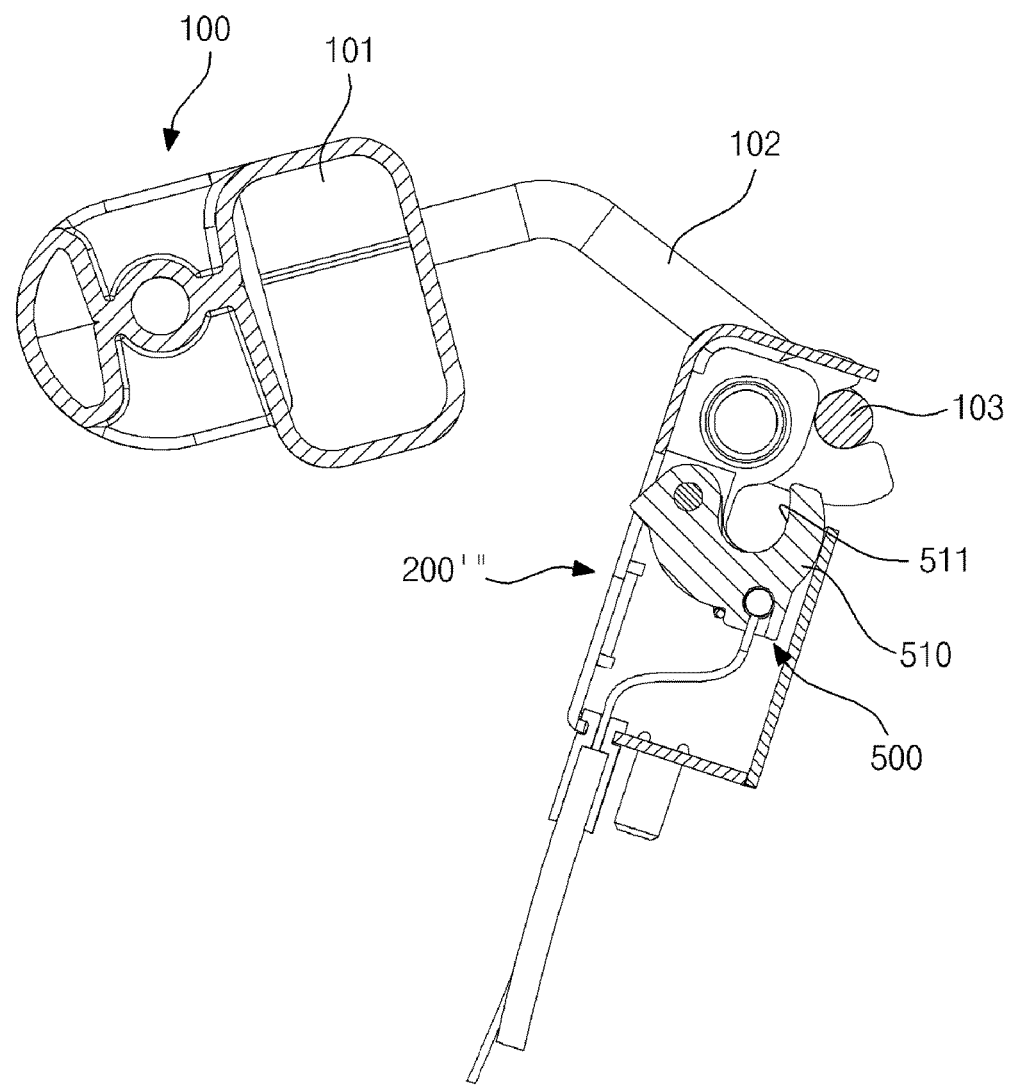
FIG. 32 is a cross-sectional view of the headrest folding apparatus according to the fourth embodiment when the headrest is located at a folded position.
Figure 33:
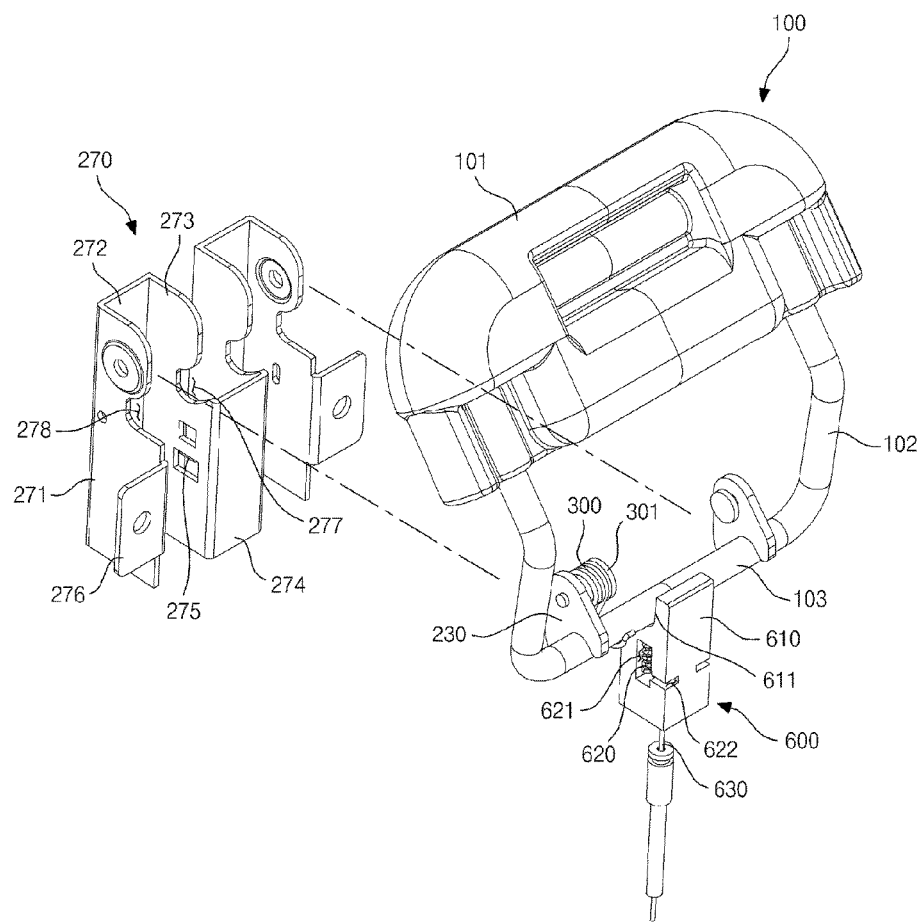
FIG. 33 is an exploded perspective view of a headrest folding apparatus according to a fifth embodiment of the present invention.
Figure 34:
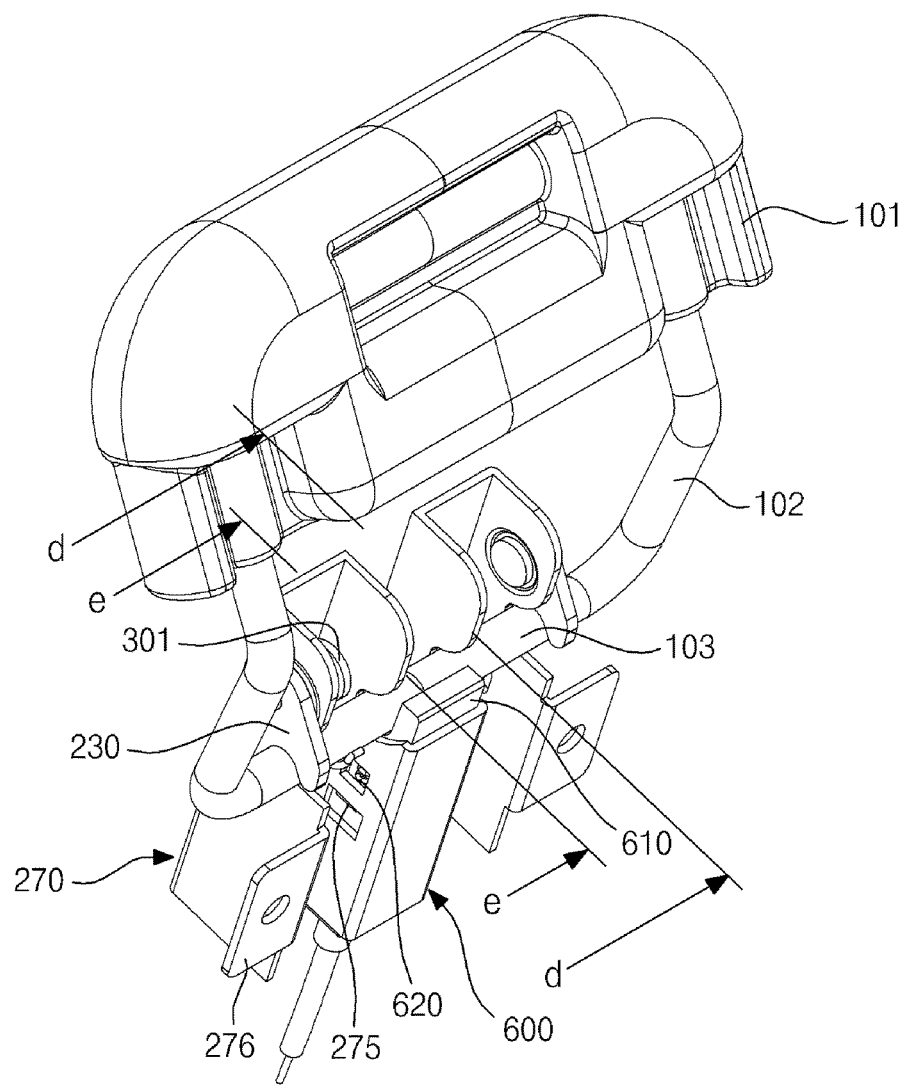
FIG. 34 is an assembled perspective view of the headrest folding apparatus of FIG. 33.
Figure 35:
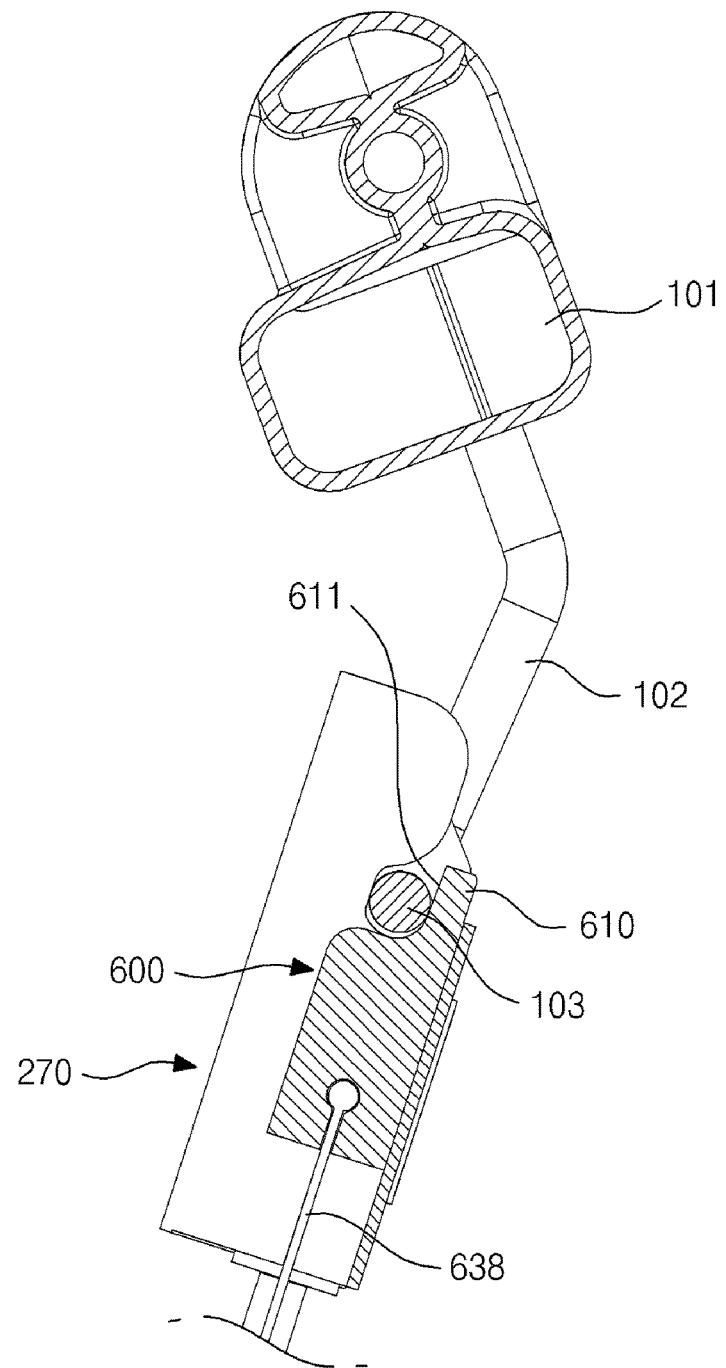
FIG. 35 is a cross-sectional view taken along line d-d of the headrest folding apparatus of FIG. 34 (when a headrest is located at an upright position)
Figure 36:
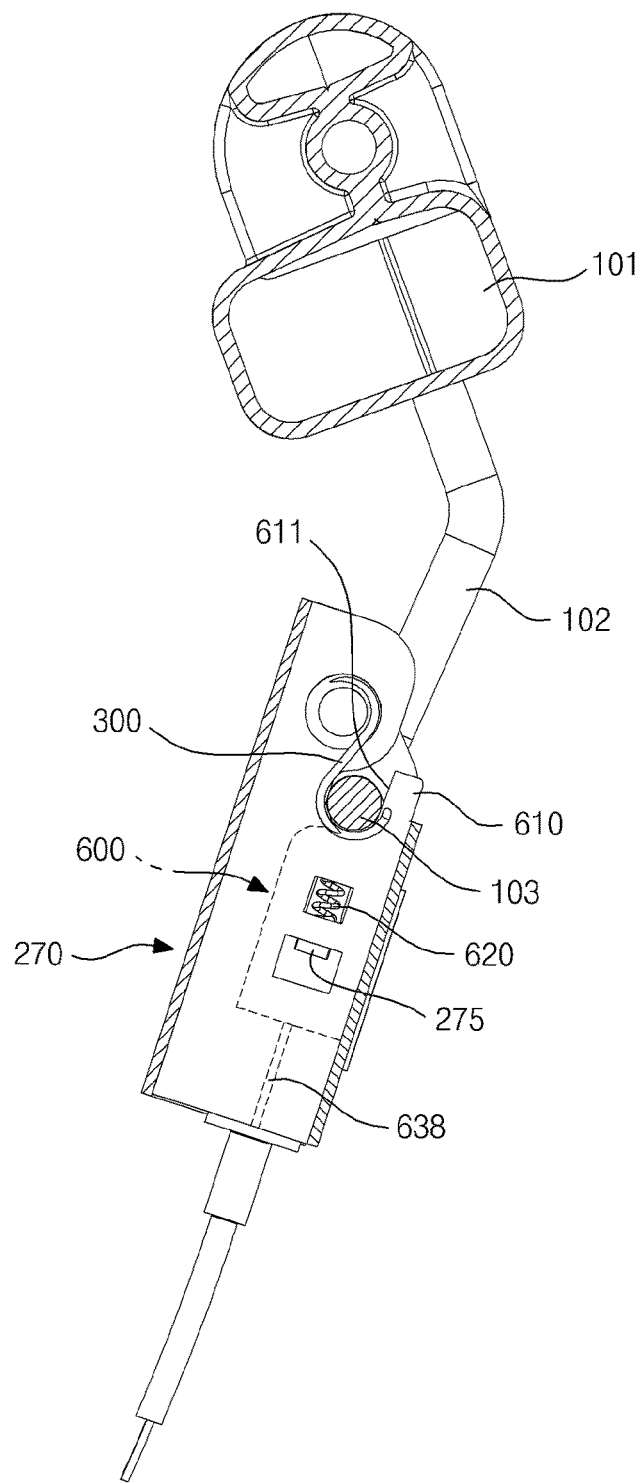
FIG. 36 is a cross-sectional view taken along line e-e of the headrest folding apparatus of FIG. 34 (when the headrest is located at the upright position)
Figure 37:
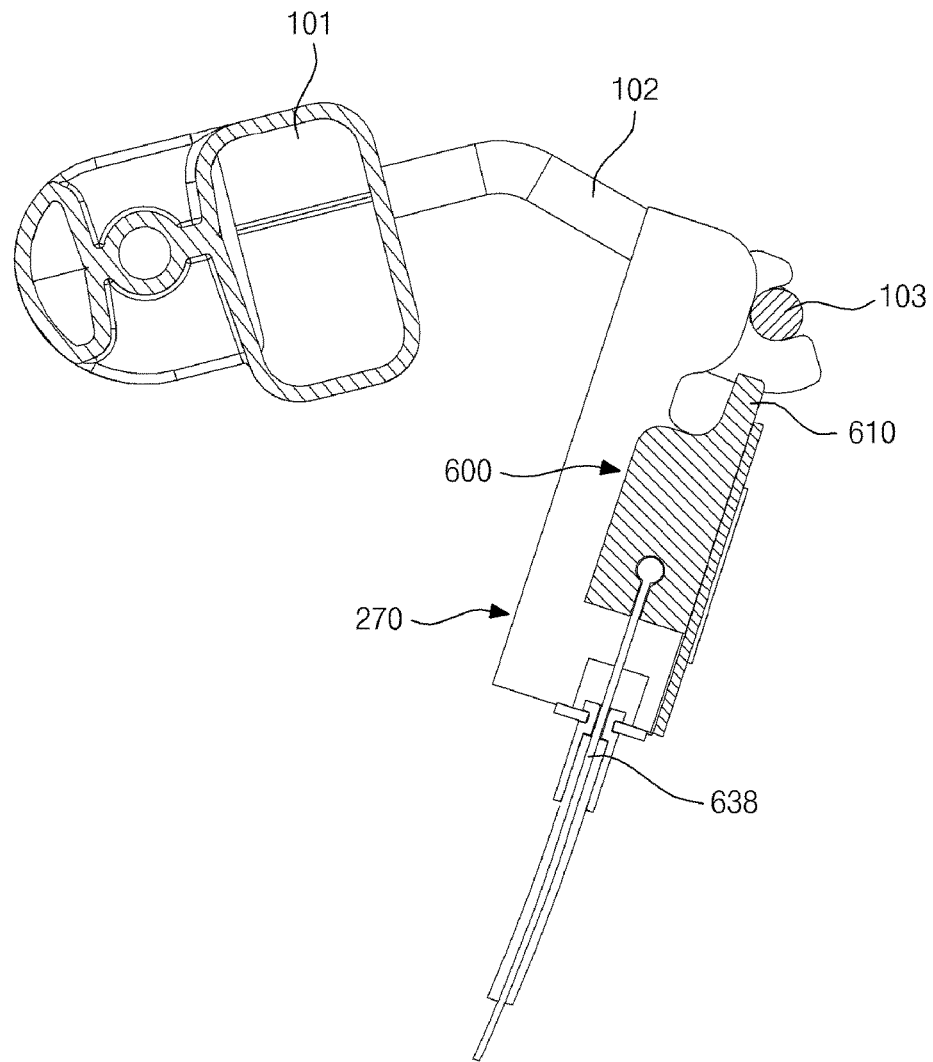
FIG. 37 is a cross-sectional view taken along line d-d of the headrest folding apparatus of FIG. 34 (when the headrest is located at a folded position)

In contrast, as illustrated in FIG. 12, the sidewalls 213 may be provided with respective brackets 226 so as to be able to be installed on the frame of the seat. Each bracket 226 may be provided with a fastening hole in which a bolt can be fastened.

An edge of the first plate part 210 is provided with a fastening protrusion 215, and an edge of the second plate part 220 is provided with a fastening recess 225 into which the fastening protrusion 215 is fitted. The first and second plate parts 210 and 220 are coupled by, for instance, welding.

The main spring 300 is connected between the first member 100 and the second member 200, and applies an elastic force to the first member 100 and the second member 200. At least one of the first and second members 100 and 200 may be turned by the elastic force of the main spring 300.

In detail, the main spring 300 is formed of a coil spring, and is fitted around the pivotal shaft 301 fastened to the auxiliary plate part 230 disposed on one side of the horizontal rod 103. The pivotal shaft 301 is horizontally disposed in a leftward/rightward direction, and acts as a pivotal shaft of the turned first member 100. The pivotal shaft 301 is disposed above and in front of the horizontal rod 103 when the headrest is in an upright state.

Thus, the main spring 300 is disposed inside the sidewall 213 and the auxiliary plate part 230.

The main spring 300 is connected in such a manner that one end thereof is fitted into the fitting hole and that the other end thereof surrounds the horizontal rod 103.

The locking member 400 is disposed in the direction opposite to the second position with respect to the first member 100 so as to come into contact with the first member 100, and fixes the headrest at the upright position.

The locking member 400 has the oblique face 411 that is the contact face coming into contact with the first member 100, and the first member 100 comes into contact with at least part of the oblique face 411 of the locking member 400 when the headrest is located at the upright position. The contact between the oblique face 411 and the first member 100 may include point, line, or surface contact.

The locking member 400 is provided with a support 410 that is installed on the second member 200, comes into direct contact with the first member 100 in the direction opposite to the direction in which the elastic force is applied to the first member 100, and supports the first member 100.

The locking member 400 is pivotably installed on the rear plate 221 of the second member 200 via a pivotal shaft 401.

The pivotal shaft 401 is horizontally disposed in the rear of the locking member 400 in a forward/backward direction.

A pivotal shaft of the second member 200 is horizontally disposed in a leftward/rightward direction. In the present embodiment, an angle at which the pivotal shaft of the locking member 400 and the pivotal shaft of the second member 200 meet is a right angle.

The locking member 400 is formed in a thick plate shape such that the support 410 protrudes upward at a right side of the locking member 400.

A left lateral face of the support 410 is vertically formed to continue to a left lateral face of the locking member 400, and an edge between a right lateral face of the support 410 and an upper face of the locking member 400 is rounded.

Both edges of a lower portion of the locking member 400 are rounded.

A fastening hole 407 into which the pivotal shaft 401 is fitted is formed at a lower left side of the locking member 400.

The pivotal shaft 401 is provided with a head in the front thereof, and the head is provided with a first step. A second step is formed in the rear of the first step so as to have a reduced outer diameter, and a third step is formed in the rear of the second step so as to have a reduced outer diameter. The head serves to support a front end of a return spring 420 (to be described below) that is fitted around an outer circumferential surface of the first step. The second step is inserted through the fastening hole 407. The third step is fitted into the first installing hole of the second member 200.

A recessed seat 406 on which a rear end of the return spring 420 is placed is formed in the front of the lower left side of the locking member 400 so as to communicate with the fastening hole 407.

Further, a protrusion is formed on a circumference of the fastening hole 407 at the rear of the locking member 400. The protrusion reinforces the circumference of the fastening hole 407 and separates the locking member 400 from the second member 200 when the locking member 400 is installed so as to minimize friction when the locking member 400 is turned.

The locking member 400 is formed in such a manner that a left lower portion (or a face facing a stopper to be described below) thereof is inclined. When the headrest is erect, the locking member 400 does not come into contact with the stopper 440. When the locking member 400 is turned to a maximum allowable angle by a driving member to be described below, the locking member 400 comes into contact with the stopper 440, and is no longer turned.

A wire installing part 403 is formed to protrude at the right side of the locking member 400.

An upper face of the wire installing part 403 is obliquely formed. The wire installing part 403 is formed in such a manner that a vertical thickness thereof is reduced toward the right side. Due to the upper face of the wire installing part 403 which is formed in this way, a wire 430 slides to a lowermost end by a dead load after being installed, and is prevented from coming off.

The wire installing part 403 is provided with a wire through-hole 404 through which the wire 430 (to be described below) passes in a vertical direction. The wire through-hole 404 extends in a leftward/rightward direction.

The wire installing part 403 is provided with a cutout 405 in the front thereof so as to communicate with the wire through-hole 404. Due to the cutout 405, the wire 430 can be easily installed.

The support 410 is provided with an oblique face 411 that is a face (front face) opposite to the first member 100. Thus, when the headrest is in an upright state, the support 410 protrudes forward toward a portion at which the support 410 and the first member 100 come into contact with each other, i.e. a lower portion of the support 410. That is, the oblique face 411 is formed to cause a wedge effect in a direction in which the elastic forces of the return spring 420 and the main spring 300 are applied.

Furthermore, a left lateral face of the support 410 which is a face opposite to a direction in which the support 410 is turned is provided with a first curved face 412 at an upper portion thereof. Further, the front face of the support 410 is provided with a second curved face 413 at an upper portion thereof so as to be disposed at an upper portion of the oblique face 411.

The first and second curved faces 412 and 413 are formed to be bulged upward like a part of a sphere. Thus, the upper portion of the support 410 is partly formed to be similar to the sphere, and is reduced in width with the approach to an upper end thereof.

The return spring 420 returns the locking member 400 to its original position when a user does not drive the locking member 400.

One end of the return spring 420 is connected to the locking member 400, and the other end of the return spring 420 is connected to the second plate part 220 of the second member 200.

The return spring 420 is disposed in the front of the locking member 400, and is housed inside the second member 200.

The driving member drives the locking member 400 to release locking. That is, the driving member displaces (slides) or turns the locking member 400.

In the present embodiment, the driving member includes the wire 430 connected to the locking member 400.

The wire 430 is provided with a spherical catch at one end thereof. The wire 430 is inserted into the wire through-hole 404 via the cutout 405.

Further, an outer circumferential surface of the wire 430 is enclosed by a guide tube 431.

The guide tube 431 serves to protect the wire 430 and to guide the wire 430.

A fitting groove is formed in an outer circumferential surface of the guide tube 431 in a circumferential direction.

Thus, when the guide tube 431 is fitted into the wire installing hole 223 of the second member 200, the second member 200 is fitted into the fitting groove, and a position of the guide tube 431 is fixed.

Further, the stopper 440 is installed in the second installing hole of the second member 200. The stopper 440 is disposed inside the second member 200 so as to be directed forward.

The stopper 440 is disposed at the left side of the locking member 400. In detail, the stopper 440 is disposed at the side opposite to the direction in which the driving member such as the wire 430 is disposed. Due to the stopper 440, the locking member 400 is prevented from being turned excessively. That is, the stopper 440 allows the locking member 400 to be turned to a predetermined angle only.

Hereinafter, an operation of the present embodiment having the aforementioned configuration will be described.

When a user pulls the wire 430 using a lever connected to the wire 430, the locking member 400 is turned in a clockwise direction. Thereby, the support 410 supporting the first member 100 is also turned, and the headrest is unlocked.

The unlocking process will be described below in detail.

The horizontal rod 103 slides from the lower portion to the upper portion of the oblique face 411 of the support 410 in contact with the lower and upper portions of the oblique face 411. Subsequently, the horizontal rod 103 is brought into contact with an upper portion of the first curved face 412 by the turned support 410. Then, the horizontal rod 103 is separated from the support 410.

Thereby, the headrest connected to the first member 100 is turned around the pivotal shaft 301 (in a counterclockwise direction) by the main spring 300, and is folded forward.

When the force pulling the wire 430 is removed, the locking member 400 is turned in the opposite direction (the counterclockwise direction) by the return spring 420, and is returned to a position before the headrest is folded.

In this way, in the state in which the headrest is folded, the horizontal rod 103 is located to the rear of the pivotal shaft 301, and is located above the support 410. Thus, in the state in which the headrest is folded, the horizontal rod 103 and the oblique face 411 of the support 410 are not in contact with each other.

When the user intends to make the headrest upright, the user pushes the headrest backward with a greater force than the elastic force of the main spring 300, and the horizontal rod 103 is turned around the pivotal shaft 301 in the opposite direction (the clockwise direction). The horizontal rod 103 is located inside an arcuate moving path along which the oblique face 411 of the support 410 moves, and comes into contact with the oblique face 411 of the support 410. When the user continues to push the headrest backward, the front of the horizontal rod 103 is located at the front end of the first through recess 214 while the horizontal rod 103 is being located below the pivotal shaft 301, and the horizontal rod 103 is caught on the sidewalls 213. The rear of the horizontal rod 103 comes into contact with a part of the oblique face 411. Thereby, the headrest is locked. That is, in the locking process, the horizontal rod 103 is located in the rear of the sidewalls 213 of the first plate part 210, and the locking member 400 is located to the rear of the horizontal rod 103.

Detailed description of the locking process is as follows.

The horizontal rod 103 comes into contact with an upper portion of the second curved face 413 of the support 410. Subsequently, the support 410 is pressed by the horizontal rod 103 moving downward, and the locking member 400 is turned in the clockwise direction. Thus, the horizontal rod 103 comes into contact with the first curved face 412, and slides to the lower portion of the oblique face 411 in contact with the oblique face 411. Thus, the horizontal rod 103 is supported by the support 410, and the headrest is locked.

Meanwhile, the oblique face 411 can slide by the return spring 420 connected to the locking member 400.

When the headrest is in the locked state in this way, the horizontal rod 103 is disposed at a rear lower portion of the pivotal shaft 301, and the oblique face 411 is disposed in the rear of the horizontal rod 103.

Further, when the headrest is in an upright state, the first member 100 is in contact with at least part of the oblique face 411 of the support 410, and the first member 100 and the support 410 are in a close contact state. For this reason, a loose gap is prevented from being generated between the first member 100 and the support 410. Further, the support 410 is subjected to the elastic force of the return spring 420, and the horizontal rod 103 is subjected to the elastic force of the main spring 300 in a backward and upward direction. Thus, the close contact state between the portion protruding forward from the oblique face 411 and the first member 100 is stably maintained.

Second Embodiment

A headrest folding apparatus according to a second embodiment is, as illustrated in FIGS. 13 to 19, characterized in that a second member 200' is pivotably connected to a headrest, and a first member 100' is connected and fixed to a seat and is a stay rod having vertical rods 102' and a horizontal rod 103'.

Detailed illustration and description of the same components as in the first embodiment will be omitted.

The second member 200' and a locking member 400' in the second embodiment have the same structure and shape as in the first embodiment, but are disposed upside down.

A first plate part 210' includes a front plate, sidewalls, and a bottom plate.

A second plate part 220' includes a top plate and a rear plate. A wire 430' is installed to pass through the top plate of the second plate part 220'.

A main spring 300 is formed of a coil spring, and is fitted around a pivotal shaft 301 fastened to an auxiliary plate part 230 disposed on one side of the horizontal rod 103'. The pivotal shaft 301 is disposed above and in front of the horizontal rod 103' when the headrest is in an upright state.

The vertical rods 102' that are vertically disposed at opposite sides of the first member 100' may be vertically adjusted in height with respect to the seat.

The vertical rods 102' are formed in such a manner that upper portions thereof are bent in a forward direction.

The vertical rods 102' may be formed in such a manner that upper ends thereof are open.

The horizontal rod 103' is installed to connect the upper portions of the opposite vertical rods 102'.

The wire 430' is inserted into the vertical rod 102' so as to be able to be guided and protected.

A support 410' is provided with an oblique face 411' at a front lower portion thereof, a second curved face 413' at a front lower end thereof, and a first curved face 412' at a right-hand lower end thereof.

Hereinafter, an operation of the present embodiment having the aforementioned configuration will be described.

When a user pulls the wire 430' using a lever connected to the wire 430', the locking member 400' is turned in a clockwise direction. Thereby, the support 410' supporting the second member 200' is also turned, and the headrest is unlocked. Thus, the headrest connected to the second member 200' is folded forward by the main spring 300.

When a force pulling the wire 430' is removed, the locking member 400' is turned in the opposite direction (the counterclockwise direction) by a return spring 420, and is returned to a position before the headrest is folded.

In this way, in the state in which the headrest is folded, the horizontal rod 103' is located to the rear of the pivotal shaft 301, and is located below the support 410'. Thus, in the state in which the headrest is folded, the horizontal rod 103' and the oblique face 411' of the support 410' are not in contact with each other.

When the user intends to make the headrest upright, the user pushes backward the headrest with a greater force than an elastic force of the main spring 300, and the second member 200' is turned around the pivotal shaft 301 in the opposite direction (the clockwise direction). The horizontal rod 103' is located inside an arcuate moving path along which the oblique face 411' of the support 410' moves, and the horizontal rod 103' comes into contact with the oblique face 411' of the support 410'. The second member 200' and the locking member 400' are turned together. When the user continues to push backward the headrest, the horizontal rod 103' is located above the pivotal shaft 301, and comes into contact with the oblique face 411'. Thereby, the headrest is locked.

Meanwhile, the oblique face 411' can slide by the return spring 420 connected to the locking member 400'.

When the headrest is in the locked state in this way, the horizontal rod 103' is disposed at a rear upper portion of the pivotal shaft 301, and the oblique face 411' is disposed in the rear of the horizontal rod 103'

When the headrest is in an upright state, the first member 100' is in contact with at least part of the oblique face 411' of the support 410', and the first member 100' and the support 410' are in a close contact state. For this reason, a loose gap is prevented from being generated between the first member 100' and the support 410'. Further, the support 410' is subjected to an elastic force of the return spring 420, and the horizontal rod 103' is subjected to the elastic force of the main spring 300 in a forward and upward direction. Thus, the close contact state between a portion protruding forward from the oblique face 411' and the first member 100' is stably maintained.

Third Embodiment

A headrest folding apparatus according to a third embodiment is, as illustrated in FIGS. 20 to 25, characterized in that a driving member is a button unit 430" that is installed on a second member 200" and turns a locking member 400" under a pressure.

A first member 100', the second member 200", and the locking member 400" are equal or similar to the first member 100', the second member 200', and the locking member 400' of the second embodiment, and thus description of the same and similar portions will be omitted.

The locking member 400" is provided with a pressing plate 450 that vertically protrudes from a left upper portion thereof. As such, a pressing force of the button unit 430" is smoothly transmitted.

A sidewall of a first plate part 210" of the second member 200" is provided with a button unit through-hole through which the button unit 430" passes.

The button unit 430" is inserted into the button unit through-hole, and is slidably installed on the second member 200". The button unit 430" is horizontally disposed in a leftward/rightward direction. Thus, it is easy for a user to operate the button unit 430".

The button unit 430" is disposed at a left side of the locking member 400".

The button unit 430" includes a cylindrical mount 431' installed aside of a headrest, a button 437 that is slidably installed in the mount 431', a button return spring 439 that is disposed between the mount 431' and the button 437 and returns the button 437, and a transmitting rod 434 that transmits a pressing force of the button 437 to press the pressing plate 450.

The mount 431' is formed in such a manner that one side thereof is opened and that the other side thereof is closed.

The mount 431' is provided with at least one fastening hook 432 cut in an outer circumferential surface thereof. Due to the fastening hook 432, the mount 431' can be installed by fitting into the headrest once.

The mount 431' is provided with at least one button rod through-hole and a spring support through-hole at the other side thereof. A first spring support surrounding the spring support through-hole is formed at the other side of the mount 431'. The first spring support is fitted into the other side of the button return spring 439 formed of a coil spring.

The button 437 is formed in a cylindrical shape in which one side thereof is closed and the other side thereof is opened.

The button 437 is provided with a second spring support 438 in the center thereof which is fitted into one side of the button return spring 439 and protrudes toward the other side thereof in a crisscross shape.

The second spring support 438 passes through the spring support through-hole, and transmits a pressing force to the transmitting rod 434.

The button 437 may be provided with at least one button rod 433 protruding from the other end thereof.

At least one of the button rods 433 is provided with a hook protrusion at a free end thereof.

The button rod 433 passes through the button rod through-hole.

Due to the button rod 433, the button 437 is slidably installed in the mount 431', and simultaneously the sliding of the button 437 is guided.

Wedges whose thicknesses are increased toward the other side of the button 437 are formed on an outer circumferential surface of the button 437 in a sliding direction.

The transmitting rod 434 is formed in a rod shape in which one side thereof has a greater outer diameter than the other side thereof and an intermediate portion between the opposite sides thereof has a greater outer diameter than each side thereof.

The intermediate portion 435 of the transmitting rod 434 is formed in such a manner that radially opposite portions thereof are flat, and is provided with a slot that passes through the flat opposite portions and is formed in a lengthwise direction.

The intermediate portion 435 of the transmitting rod 434 is inserted into the button unit through-hole of the second member 200".

The intermediate portion 435 of the transmitting rod 434 is provided with catch steps 436 at opposite ends thereof which are caught on the second member 200". Thus, the transmitting rod 434 is prevented from escape from the second member 200".

Radially opposite portions of the other end of the transmitting rod 434 are provided with protrusions whose heights are reduced toward the other end of the transmitting rod 434.

The other end of the transmitting rod 434 is formed in a hemispherical shape.

When the headrest is in an upright state, the other end of the transmitting rod 434 is located in the middle of the pressing plate 450.

Hereinafter, an operation of the present embodiment having the aforementioned configuration will be described.

When a user pushes the button 437 disposed on the headrest, the transmitting rod 434 is pushed, and the pressing plate 450 of the locking member 400" is pressed. Accordingly, the locking member 400" is turned in a clockwise direction. Thus, the support 410' supporting the second member 200" is also turned, and the headrest connected to the second member 200" is folded forward by the main spring 300.

When a force pushing the button 437 is removed, the locking member 400" is turned in the opposite direction by a return spring 420, and is returned to its original position.

When the user intends to make the headrest upright, the user pushes backward the headrest with a greater force than an elastic force of the main spring 300, and the locking member 400" is turned backward along with the second member 200". In this process, a lower end of an oblique face 411" of the support 410" of the locking member 400" comes into contact with the horizontal rod 103'. Thereafter, the oblique face 411" slides in contact with the horizontal rod 103' until the headrest reaches an upright position. When the headrest is completely erect, the horizontal rod 103' of the first member 100' is in contact with at least part of the oblique face 411" of the support 410", and the first member 100' and the support 410" are in a close contact state. For this reason, a loose gap is prevented from being generated between the first member 100' and the support 410". Further, the support 410" is subjected to an elastic force of the return spring 420, and the contact state between a portion protruding forward from the support 410" and the first member 100' is stably maintained.

Fourth Embodiment

A headrest folding apparatus according to a fourth embodiment is, as illustrated in FIGS. 26 to 32, configured in such a manner that a pivotal shaft of a locking member 500 and a pivotal shaft of a second member 200''' are disposed in parallel, that the second member 200''' is connected to a seat, that a first member 100 is connected to a headrest, and that the pivotal shaft of the locking member 500 is disposed at a second position (or a front position) with respect to the first member 100.

The first member 100, the second member 200''', and a main spring 300 are equal or similar to the first member 100, the second member 200, and the main spring 300 of the first embodiment, and thus, description of the same and similar portions refers to the aforementioned embodiment and will be omitted.

The second member 200''' includes a first plate part 250, and a second plate part 260 installed in the rear of the first plate part 250.

The first plate part 250 includes a top plate 252, a front plate 253 that is continuously formed under the top plate 252, sidewalls 251 that are disposed on opposite sides of the top plate 252 and the front plate 253, and a bottom plate 254 that is formed at lower ends of the front plate 253 and the sidewalls 251.

The front plate 253 is provided with a slit 255 in a vertical direction.

Each sidewall 251 is provided with a first through recess 257 through which a horizontal rod 103 of the first member 100 passes. When viewed from the side, the first through recess 257 is formed in such a manner that an upper portion thereof is inclined such that a height is gradually reduced in a forward direction and that a lower portion thereof is horizontally flat.

The bottom plate 254 is provided with a wire installing hole 256. The wire installing hole 256 is formed to communicate with the cutout 255.

The bottom plate 254 is provided with through-holes through which fastening bolts 240 pass. Thus, the second member 200''' is installed in the seat.

The second plate part 260 includes a rear plate 262 and sidewalls 261 disposed on opposite sides of the rear plate 262.

The opposite sidewalls 261 are each provided with a fastening segment 263 that protrudes outwards. Thereby, the second plate part 260 is installed on a rear face of the front plate 253 of the first plate part 250.

An upper portion of each sidewall 261 is provided with a recess in which the horizontal rod 103 is placed, and a slope. The slope is located in the rear of the recess.

The locking member 500 is formed in the shape of a plate that is vertically disposed in a forward/backward direction.

The pivotal shaft 501 of the locking member 500 is horizontally disposed in a leftward/rightward direction so as to be parallel to the pivotal shaft of the first member 100 or the second member 200'''.

The pivotal shaft 501 is installed on the sidewalls 261 of the second plate part 260, and thus the locking member 500 is pivotably installed on the second member 200'''.

A fastening hole 507 into which the pivotal shaft 501 is fitted is formed in the front of the locking member 500, and passes through the locking member 500 in a leftward/rightward direction.

A nose 508 is formed in front of the fastening hole 507 of the locking member 500. The nose 508 serves as a stopper that is caught on the cutout 255.

A curved face 511 is formed in the rear of the locking member 500.

A rod cradle 512 is formed between the curved face 511 and the fastening hole 507, and the horizontal rod 103 is placed in the rod cradle 512 when the headrest is in the upright state. The rod cradle 512 is formed in an arcuate shape that is recessed downwards.

Thus, when the headrest is in the upright state, the pivotal shaft of the locking member 500 is located in front of the horizontal rod 103 of the first member 100.

A wire installation part 503 is formed at a lower portion of the locking member 500. The wire installation part 503 is disposed below the curved face 511.

A return spring 520 is fitted around the pivotal shaft 501. One end of the return spring 520 is connected to the locking member 500, and the other end of the return spring 520 is connected to the bottom plate 254 of the second plate part 260.

Hereinafter, an operation of the present embodiment having the aforementioned configuration will be described.

When a user pulls a wire 530 using a lever connected to the wire 530, the locking member 500 is turned in a clockwise direction. Thereby, the support 510 supporting the first member 100 is also turned around the pivotal shaft 501, and moves down. In this way, the support 510 supporting the horizontal rod 103 is removed, and the headrest is unlocked. Thus, the headrest connected to the first member 100 is folded forward by an elastic force of the main spring 300.

When a force pulling the wire 530 is removed, the locking member 500 is turned in the opposite direction by the return spring 520, and is returned to its original position.

When the user intends to make the headrest upright, the user pushes backward the headrest with a greater force than the elastic force of the main spring 300. Thus, the headrest and the horizontal rod 103 are turned around a pivotal shaft 301, and the horizontal rod 103 moves in a backward and downward direction. When the user continues to push backward the headrest, the horizontal rod 103 comes into contact with the curved face 511, and slides along the curved face 511.

When the headrest is completely erect, the horizontal rod 103 of the first member 100 is in contact with at least part of the curved face 511 of the support 510, and the first member 100 and the support 510 are in a close contact state. For this reason, a loose gap is prevented from being generated between the first member 100 and the support 510. Further, the support 510 is subjected to an elastic force of the return spring 520, and the contact state between a portion protruding forward from the support 510 and the first member 100 is stably maintained.

Fifth Embodiment

A headrest folding apparatus according to a fifth embodiment is, as illustrated in FIGS. 33 to 37, configured in such a manner that a locking member 600 is installed on a second member 270 so as to be slidable in a vertical direction.

A first member 100, the second member 270, and a main spring 300 are equal or similar to the first member 100, the second member 200, and the main spring 300 of the first embodiment, and thus description of the same and similar portions refers to the aforementioned embodiment and will be omitted.

The second member 270 includes a front plate 272 and sidewalls 271 that are formed on opposite sides of the front plate 272.

Each sidewall 271 is provided with a first through recess 278 through which a horizontal rod 103 of the first member 100 passes. When viewed from the side, the first through recess 278 is formed in such a manner that an upper portion thereof is inclined such that a height is gradually reduced in a forward direction and that a lower portion thereof is horizontally flat.

Each sidewall 271 is provided with a fastening segment 276 protruding outwards. The second member 270 is installed on a seat using the fastening segment 276.

The front plate 272 is provided with guide sidewalls 273, which are bent backward in parallel, and a guide rear plate 274, which connects rear ends of the parallel guide sidewalls 273, at an intermediate portion thereof.

In this way, since the guide sidewalls 273 and the guide rear plate 274 are formed on the front plate 272, a guide channel for vertically guiding the locking member 600 is formed.

Each guide sidewall 273 is provided with a second through recess 277 in the rear thereof. When viewed from the side, the second through recess 277 is formed in an oblique shape such that upper and lower portions thereof are reduced in height in a forward direction.

The guide sidewalls 273 facing a return spring 620 are each provided with a hole. A lower end of the return spring 620 is supported by supporting plates 275 disposed below the respective holes.

The supporting plates 275 are each formed by cutting a part of each guide sidewall 273 and bending the cut part toward an inner side of each guide sidewall 273.

A wire installing segment is formed at lower portions of the guide sidewalls 273 facing the return spring 620 so as to be disposed between the opposite guide sidewalls 273. The wire installing segment is provided with a wire installing hole into which a wire 630 is fitted.

The locking member 600 is formed in a bar shape so as to be disposed vertically.

The locking member 600 is disposed under the horizontal rod 103.

The locking member 600 is provided with a support 610 at a rear upper portion thereof, and a curved face 611 formed in the front of the support 610.

Holes 621 for receiving the supporting plates 275 on which the return spring 620 vertically disposed in a coil shape is placed are vertically formed at opposite sides of the locking member 600.

Leading slots 622 are horizontally formed in the rear of the locking member 600 so as to communicate with the holes 621 for receiving the supporting plates. When assembled, the supporting plates 275 are led into the leading slots 622, and can be placed in the holes 621 for receiving the supporting plates.

A wire installation part on which the wire 630 is installed is formed at a lower portion of the locking member 600.

The locking member 600 is disposed to be surrounded by the opposite guide sidewalls 273 and guide rear plate 274 of the second member 270, and is guided when moving in an upward or downward direction.

Hereinafter, an operation of the present embodiment having the aforementioned configuration will be described.

When a user pulls the wire 630 using a lever connected to the wire 630, the locking member 600 moves down relative to the first and second members 100 and 270. Thereby, the support 610 supporting the horizontal rod 103 is removed, and the headrest is unlocked. Thus, the headrest connected to the first member 100 is folded forward by an elastic force of the main spring 300.

Meanwhile, when the locking member 600 moves down, an interval between each supporting plate 275 and a portion of the locking member 600 which supports an upper end of the return spring 620 is reduced, and the return spring 620 is compressed. When a force pulling the wire 630 is removed, the locking member 600 is raised upward by the return spring 620.

When the user intends to make the headrest upright, the user pushes backward the headrest with a greater force than the elastic force of the main spring 300. Thus, the headrest and the horizontal rod 103 are turned around a pivotal shaft 301, and the horizontal rod 103 moves in a backward and downward direction. When the user continues to push backward the headrest, the horizontal rod 103 comes into contact with the curved face 611, and slides down along the curved face 611.

When the headrest is completely erect, the horizontal rod 103 of the first member 100 is in contact with at least part of the curved face 611 of the support 610, and the first member 100 and the support 610 are in a close contact state. For this reason, a loose gap is prevented from being generated between the first member 100 and the support 610. Further, the support 610 is subjected to an elastic force of the return spring 620, and the contact state between a portion protruding forward from the support 610 and the first member 100 is stably maintained.

Sixth Embodiment

Figure 38:
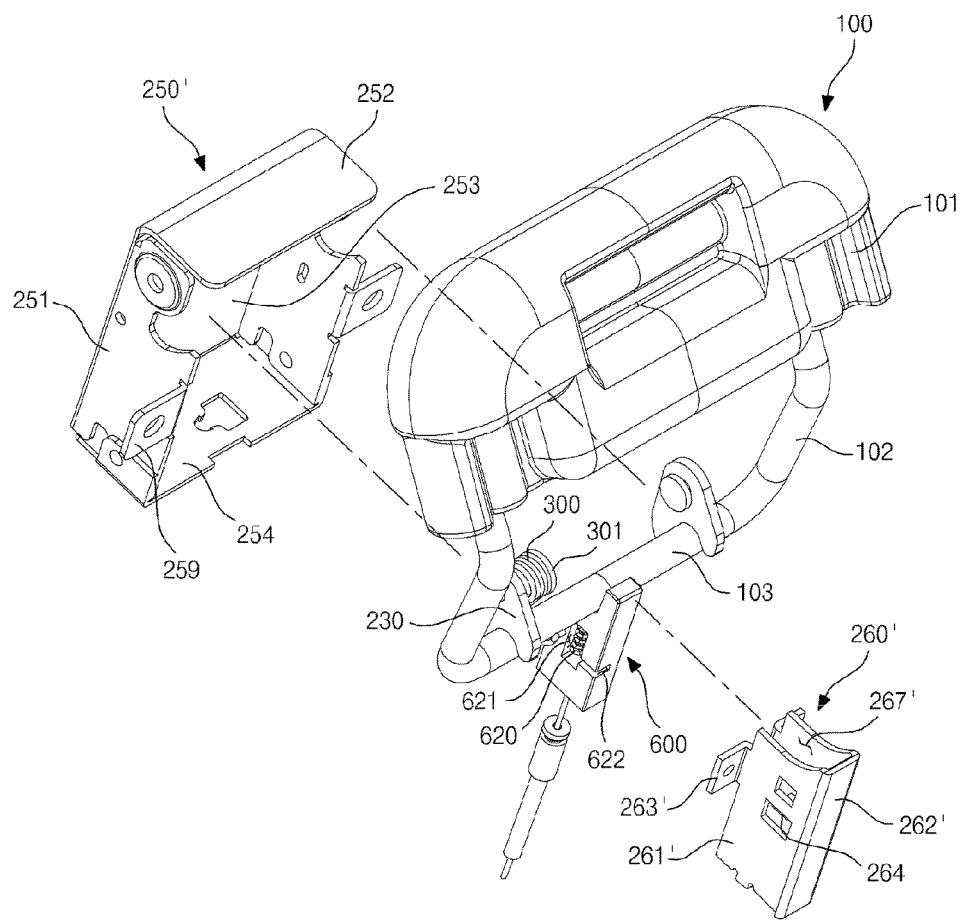
FIG. 38 is an exploded perspective view of a headrest folding apparatus according to a sixth embodiment of the present invention.
Figure 39:
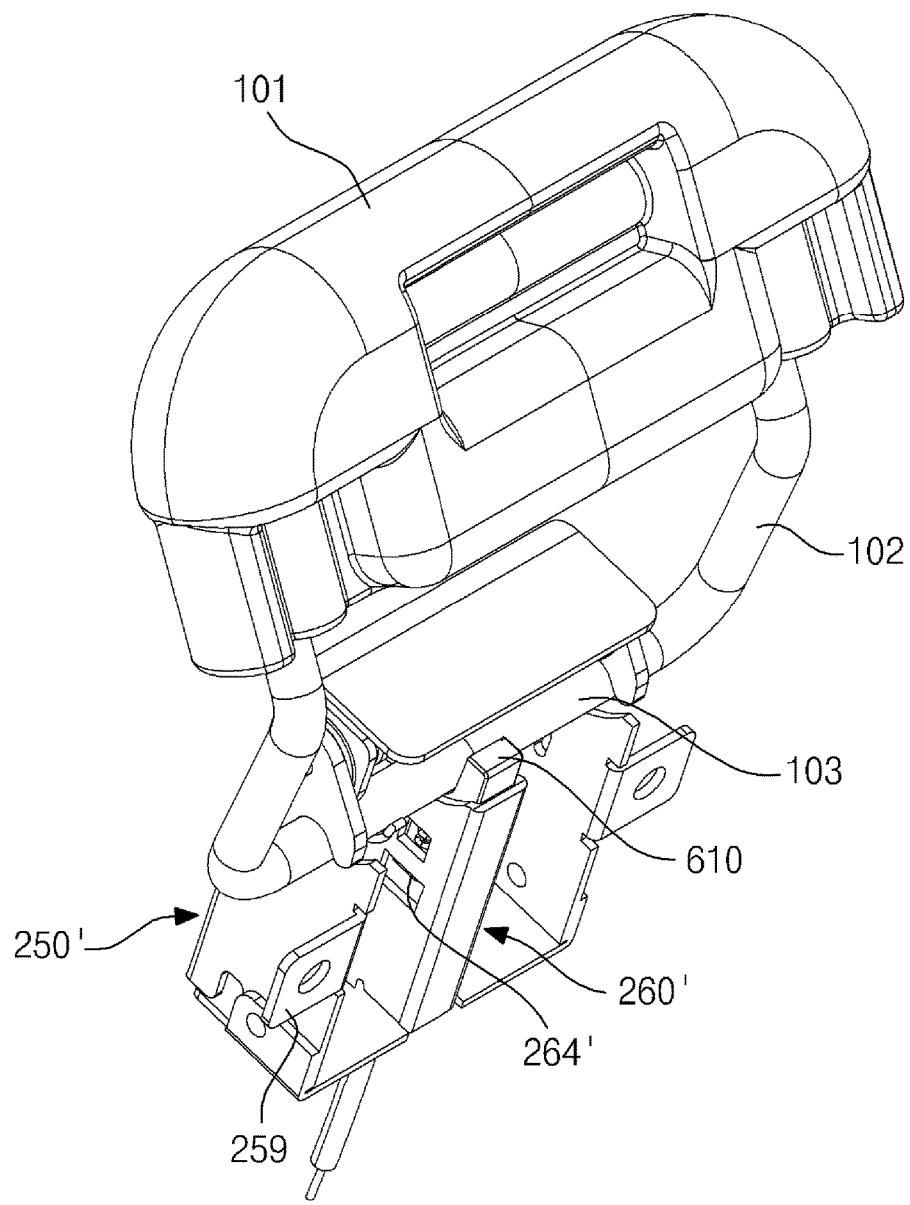
FIG. 39 is an assembled perspective view of the headrest folding apparatus of FIG. 38.
Figure 40:
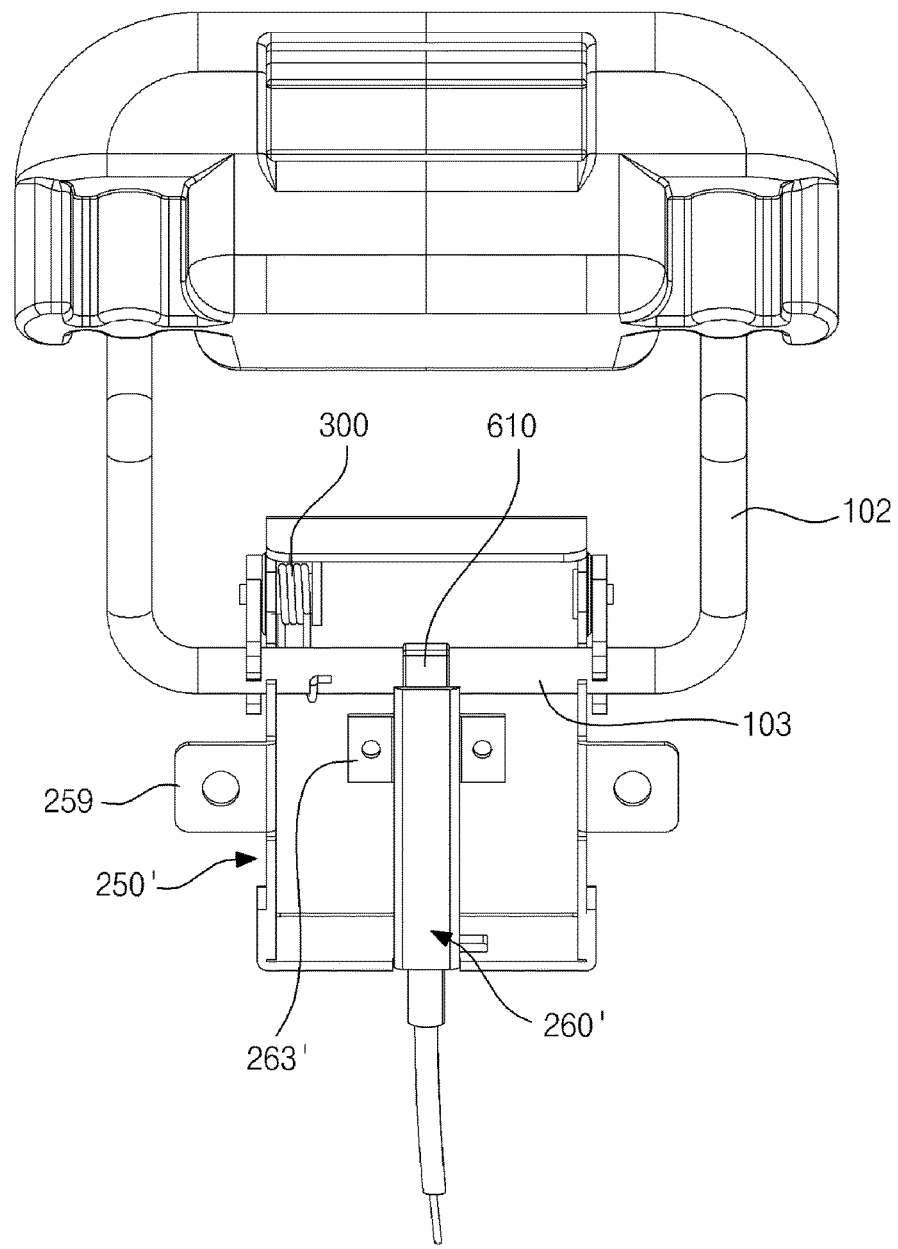
FIG. 40 is a rear view of the headrest folding apparatus of FIG. 38.
Figure 41:
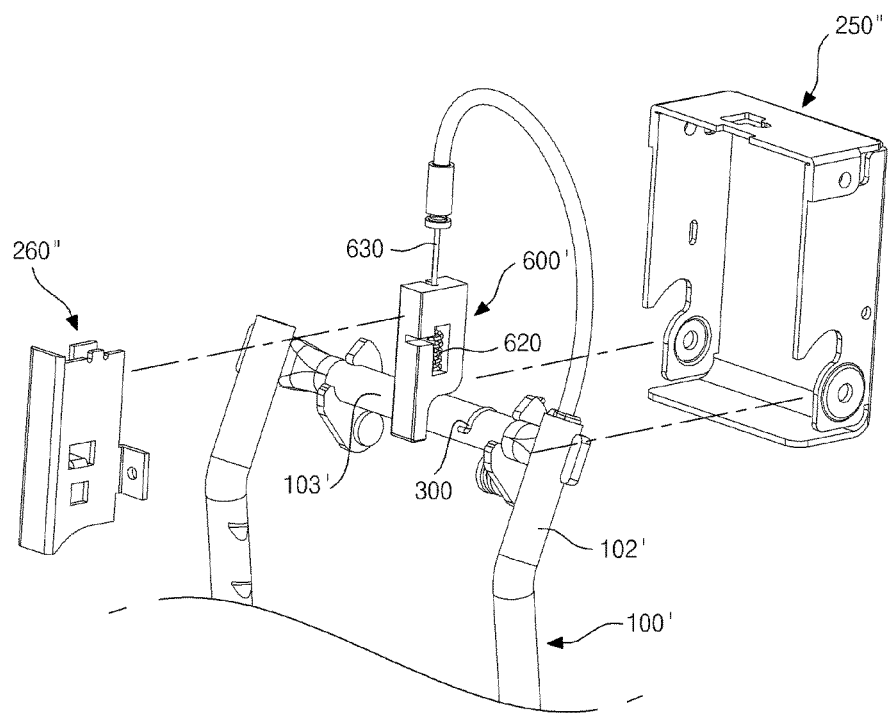
FIG. 41 is an exploded perspective view of a headrest folding apparatus according to a seventh embodiment of the present invention.
Figure 42:
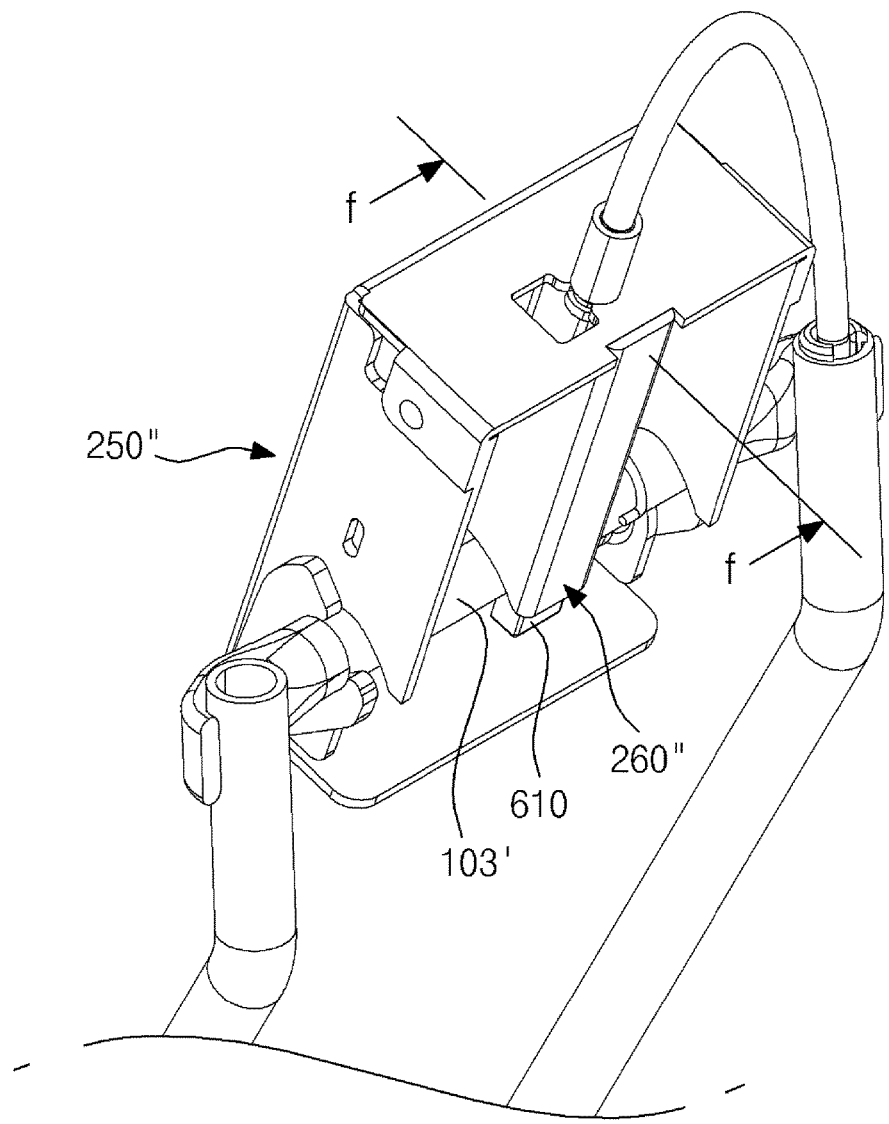
FIG. 42 is an assembled perspective view of the headrest folding apparatus of FIG. 41.
Figure 43:
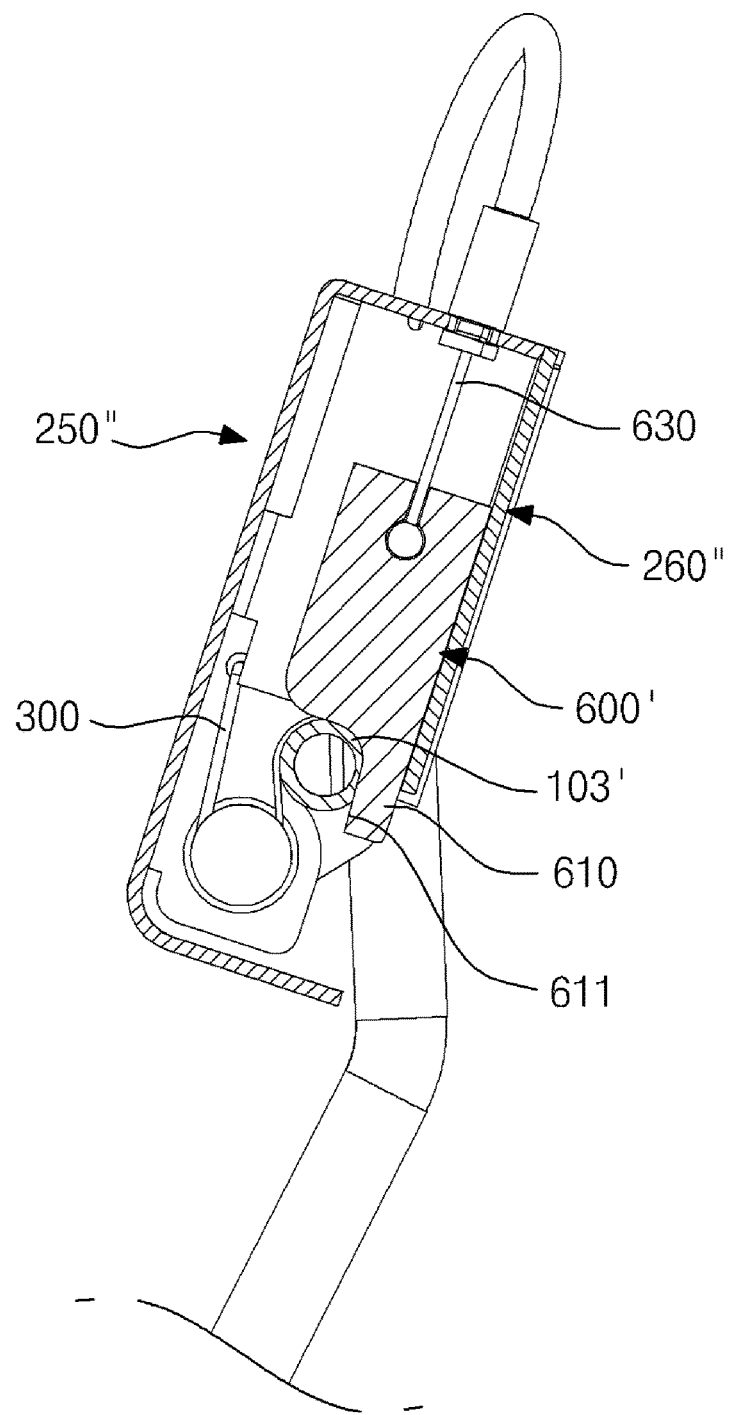
FIG. 43 is a cross-sectional view taken along ling f-f of FIG. 42 (when a headrest is located at an upright position)
Figure 44:
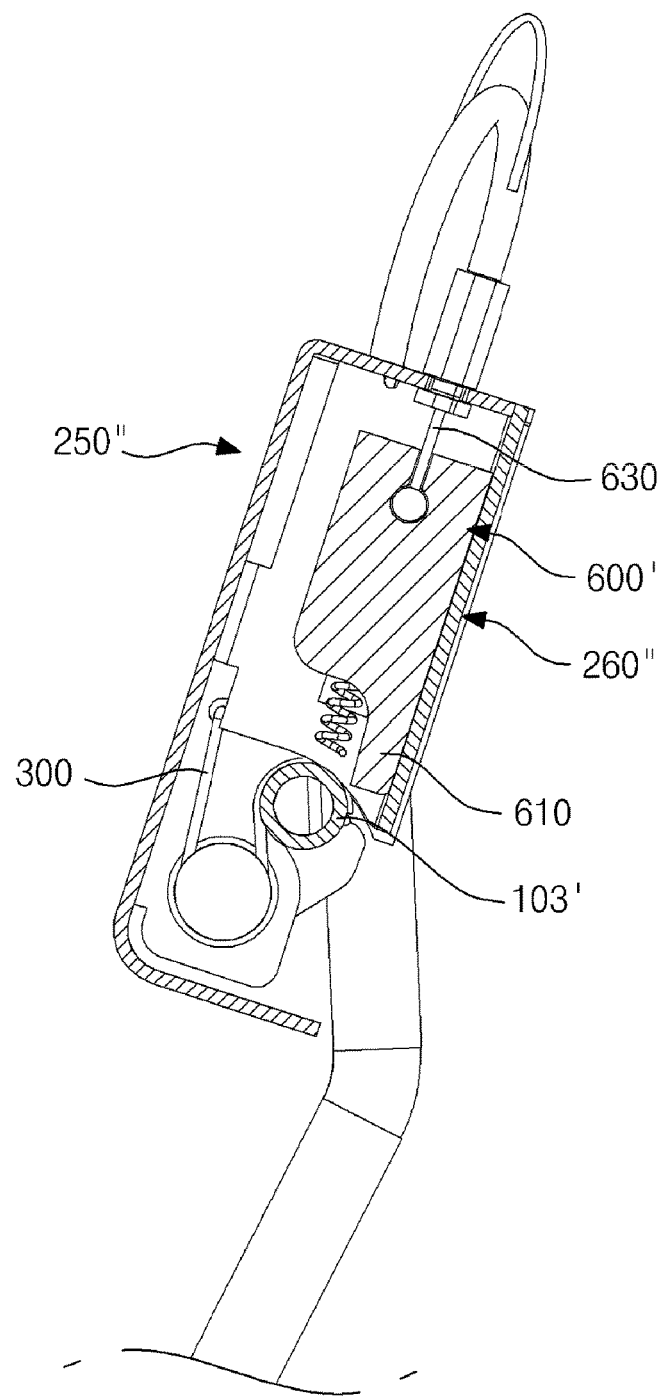
FIG. 44 is a cross-sectional view illustrating a state in which a locking member of the headrest folding apparatus according to the fifth embodiment is raised to fold the headrest by pulling a wire.
Figure 45:
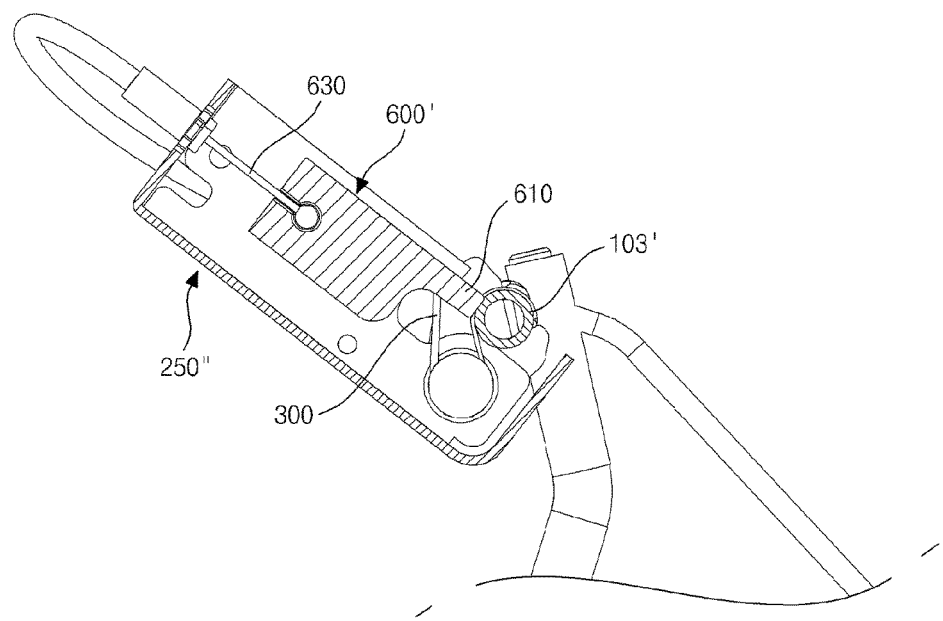
FIG. 45 is a cross-sectional view of the headrest folding apparatus according to the seventh embodiment when the headrest is located at a folded position.

A headrest folding apparatus according to a sixth embodiment is, as illustrated in FIGS. 38 to 40, configured in such a manner that a bracket 260' in which a guide channel 267' for guiding a locking member 600 is vertically formed is installed on a second member, and supporting plates 264 are formed at the bracket 260'.

A first member 100, a main spring 300, and the locking member 600 are equal or similar to the first member 100, the main spring 300, and the locking member 600 of the fifth embodiment, and the second member is equal or similar to the second member 200''' of the fourth embodiment. Thus, description of the same and similar portions refers to the aforementioned embodiments and will be omitted.

The second member includes a first plate part 250', and the bracket 260' installed in the rear of the first plate part 250'.

The first plate part 250' includes a top plate 252, a front plate 253 that is continuously formed under the top plate 252, sidewalls 251 that are disposed on opposite sides of the top plate 252 and the front plate 253, and a bottom plate 254 that is disposed at lower portions of the front plate 253 and the sidewalls 251.

Each sidewall 251 is provided with a fastening segment 259 protruding outwards, and the second member is connected to a seat.

The bottom plate 254 is provided with a wire installing hole into which a wire 630 is fitted.

The bracket 260' includes opposite guide sidewalls 261' and a guide rear plate 262' connecting rear ends of the guide sidewalls 261'.

The bracket 260' has the guide channel 267' that is vertically defined by the guide sidewalls 261' and the guide rear plate 262' and that guides the locking member 600.

An upper portion of each guide sidewall 261' is curved such that a height is gradually increased in a backward direction.

A fastening segment 263' is formed in the front of each guide sidewall 261' so as to protrude outward. The bracket 260' is installed at the back of the front plate 253 using the fastening segments 263'.

Each guide sidewall 261' is provided with a supporting plate 264' protruding inwards.

Hereafter, an assembling method of the present embodiment having the aforementioned configuration will be described.

The locking member 600 is pushed into the guide channel 267' so as to be disposed between the guide sidewalls 261' and the guide rear plate 262'. In this case, the supporting plates 264' are pushed to pass through leading slots 622 to be placed in holes 621 for receiving the supporting plates 264'. The bracket 260' is installed on the first plate part 250' using the fastening segments 263'. The assembling process is completed.

A method of operating the headrest of the present embodiment having the aforementioned configuration is the same as in the fifth embodiment, and description thereof will be omitted.

Seventh Embodiment

A headrest folding apparatus according to a seventh embodiment is, as illustrated in FIGS. 41 to 45, configured in such a manner that a second member in which a locking member 600' is installed to be slidable in an upward/downward direction is connected to a headrest, and a first member 100' is connected to a seat.

The second member, the locking member 600', and a main spring 300 of the present embodiment have the same structure and shape and are disposed upside down, compared to the second member, the locking member 600, and the main spring 300 of the sixth embodiment.

Further, the first member 100' of the present embodiment is the same as the first member 100' of the second embodiment.

In this way, description of the same and similar portions refers to the aforementioned embodiments, and will be omitted.

The second member includes a first plate part 250" and a bracket 260" installed at the back of a front plate of the first plate part 250".

A wire is installed on a top plate of the first plate part 250".

The locking member 600' and the bracket 260" are disposed on a horizontal rod 103', and a support 610 is formed to protrude from a rear lower portion of the locking member 600'.

The support 610 has an oblique face formed on a front face thereof such that the front face thereof protrudes forward in an upward direction.

Hereinafter, an operation of the present embodiment having the aforementioned configuration will be described.

When a user pulls the wire 630 using a lever connected to the wire 630, the locking member 600' moves up relative to the second member and the horizontal rod 103'. Thereby, the support 610 caught on the horizontal rod 103' is removed, and the headrest is unlocked. Thus, the headrest connected to the first member 100 is folded forward by an elastic force of the main spring 300.

Meanwhile, when the locking member 600' moves up, an interval between each supporting plate 275 and a portion of the locking member 600' which supports an upper end of a return spring 620 is reduced, and the return spring 620 is compressed. When a force pulling the wire 630 is removed, the locking member 600' is lowered downward by the return spring 620.

When the user intends to make the headrest upright, the user pushes backward the headrest with a greater force than the elastic force of the main spring 300. Thus, the headrest and the second member are turned, and the locking member 600' moves in a backward and downward direction. When the user continues to push backward the headrest, the oblique face 611 comes into contact with the horizontal rod 103', and slides down along an outer circumferential surface of the horizontal rod 103'.

When the headrest is completely erect, the horizontal rod 103' of the first member 100' is in contact with at least part of the oblique face 611 of the support 610, and the first member 100' and the support 610' are in a close contact state. For this reason, a loose gap is prevented from being generated between the first member 100' and the support 610. Further, the support 610 is subjected to an elastic force of the return spring 620, and the contact state between a portion protruding forward from the support 610 and the first member 100' is stably maintained.

Although exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A headrest folding apparatus comprising:
 a first member that is connected to one of a seat and a headrest;
 a second member that is connected to the other of the seat and the headrest and is pivotably installed on the first member;
 a main spring that is connected between the first member and the second member and applies an elastic force to the first and second members so as to displace the headrest to a second position; and
 a locking member that is installed on the second member, is disposed in a direction opposite to the second position with respect to the first member so as to come into contact with the first member, and fixes the headrest at a first position,
 wherein the second position is a position at which the headrest is folded, and the first position is a position at which the headrest is erect, the locking member has an oblique face formed on a contact face coming into contact with the first member, and the first member comes into contact with at least part of the oblique face of the locking member when the headrest is located at the first position,
 and further comprising:
 a return spring that returns the locking member to its original position;
 and a driving member that drives the locking member,
 wherein the locking member is pivotably installed on the second member, a pivotal shaft of the locking member is disposed in a forward/backward direction, and a pivotal shaft of the second member is disposed in a leftward/rightward direction.

2. The headrest folding apparatus according to claim 1, wherein the driving member is a wire that is connected to the locking member and unlocks the headrest.

3. The headrest folding apparatus according to claim 1, wherein the driving member is a button unit that presses the locking member to unlock the headrest.

4. A headrest folding apparatus comprising:
 a first member that is connected to one of a seat and a headrest;
 a second member that is connected to the other of the seat and the headrest and is pivotably installed on the first member;
 a main spring that is connected between the first member and the second member and applies an elastic force to the first and second members so as to displace the headrest to a second position; and
 a locking member that is installed on the second member, is disposed in a direction opposite to the second position with respect to the first member so as to come into contact with the first member, and fixes the headrest at a first position,
 wherein the second position is a position at which the headrest is folded, and the first position is a position at which the headrest is erect, the locking member has an oblique face formed on a contact face coming into contact with the first member, and the first member comes into contact with at least part of the oblique face of the locking member when the headrest is located at the first position,
 and further comprising:
 a return spring that returns the locking member to its original position;
 and a driving member that drives the locking member,
 wherein the locking member is installed on the second member so as to be slidable up and down.

5. The headrest folding apparatus according to claim 4, wherein the locking member includes supporting plate receiving holes between which the return spring is disposed and which are formed in an upward/downward direction, and the second member includes supporting plates that are disposed in the supporting plate receiving holes and support one end of the return spring.

6. The headrest folding apparatus according to claim 5, wherein the second member is coupled with a bracket in which a guide channel for guiding the locking member is formed in the upward/downward direction, and the supporting plates are formed on the bracket.

7. The headrest folding apparatus according to claim 5, wherein the second member has a guide channel that guides the locking member and is formed in the upward/downward direction.

* * * * *